United States Patent [19]

Kacandes et al.

[11] Patent Number: 5,524,068
[45] Date of Patent: Jun. 4, 1996

[54] METHOD AND APPARATUS FOR FINDING AREAS OF INTEREST IN IMAGES

[75] Inventors: Peter N. Kacandes, White Plains, N.Y.; John H. Dowling, Brookfield, Conn.

[73] Assignee: United Parcel Service of America, Inc., Atlanta, Ga.

[21] Appl. No.: 257,501

[22] Filed: Jun. 9, 1994

Related U.S. Application Data

[63] Continuation of Ser. No. 935,152, Aug. 21, 1992, abandoned.

[51] Int. Cl.$^6$ .................................................. G06K 9/44
[52] U.S. Cl. .................... 382/258; 382/303; 382/308; 382/103; 382/299
[58] Field of Search ................................ 382/303, 304, 382/260, 258, 232, 299, 141, 143, 103, 257, 264, 308

[56] References Cited

U.S. PATENT DOCUMENTS

| | | | |
|---|---|---|---|
| 4,901,365 | 2/1990 | Kelland | 382/48 |
| 4,916,298 | 4/1990 | Raphaël | 235/463 |
| 4,948,955 | 8/1990 | Lee et al. | 235/462 |
| 5,068,905 | 11/1991 | Hackett et al. | 382/47 |
| 5,077,812 | 12/1991 | Kanno et al. | 382/50 |
| 5,120,940 | 6/1992 | Willsie | 235/462 |
| 5,124,537 | 6/1992 | Chandler et al. | 235/462 |
| 5,134,272 | 7/1992 | Tsuchiya et al. | 382/48 |
| 5,151,953 | 9/1992 | Landeta | 382/41 |
| 5,155,343 | 10/1992 | Chandler et al. | 235/462 |
| 5,199,084 | 3/1993 | Kishi et al. | 382/48 |
| 5,220,647 | 6/1993 | Kumagai | 382/27 |

FOREIGN PATENT DOCUMENTS

| | | |
|---|---|---|
| 2090383 | 3/1990 | Japan . |
| 3042789 | 2/1991 | Japan . |
| 4023073 | 1/1992 | Japan . |

OTHER PUBLICATIONS

Interactive Image–Analysis Program, NASA Tech Briefs, Jul. 1993.
Digital Image Processing, Second Edition, by Rafael C. Gonzalez and Paul Wintz, Addison–Wesley Publishing Company, pp. 161–173 and 186–190. 1987.

*Primary Examiner*—Leo Boudreau
*Assistant Examiner*—David R. Anderson
*Attorney, Agent, or Firm*—Steve Mendelsohn; William H. Murray

[57] ABSTRACT

An apparatus, and corresponding method for finding an area of interest in an input image, filters the input image with at least one compression filter to generate a final compressed image. The apparatus determines the location of an artifact in the final compressed image and then determines the location of the area of interest in the input image according to the location of the artifact in the final compressed image. An apparatus, and corresponding method for finding one or more artifacts in a two-dimensional image, receives a first row of the image and generates a list of regions in accordance with the first row. The apparatus receives a next row of the image and updates the list of regions in accordance with the next row. The apparatus determines whether a region in the list of regions corresponds to an artifact in the image and, if so, selects the region as the artifact.

12 Claims, 15 Drawing Sheets

FIG. 5

| TIME PERIOD | (1X4) FILTER 420 ACTIVITY |
|---|---|
| ROW 1: | FILTER ROW 1, TRANSMIT ROW 1 RESULTS TO BUFFER 404 |
| ROW 2: | FILTER ROW 2, TRANSMIT ROW 2 RESULTS TO FILTER 406 |
| ROW 3: | FILTER ROW 3, TRANSMIT ROW 3 RESULTS TO BUFFER 404 |
| ROW 4: | FILTER ROW 4, TRANSMIT ROW 4 RESULTS TO FILTER 410 |

| TIME PERIOD | (1X4) BUFFER 404 ACTIVITY |
|---|---|
| ROW 1: | RECEIVE AND STORE ROW 1 RESULTS FROM FILTER 402 |
| ROW 2: | TRANSMIT ROW 1 RESULTS TO FILTER 406 |
| ROW 3: | RECEIVE AND STORE ROW 3 RESULTS FROM FILTER 402 |
| ROW 4: | TRANSMIT ROW 3 RESULTS TO FILTER 410 |

| TIME PERIOD | (2X4) FILTER 406 ACTIVITY |
|---|---|
| ROW 1: | INACTIVE |
| ROW 2: | RECEIVE ROW 1 RESULTS FROM BUFFER 404, RECEIVE ROW 2 RESULTS FROM FILTER 402, FILTER ROW 1-2 RESULTS, TRANSMIT ROW 1-2 RESULTS TO BUFFER 408 |
| ROW 3: | INACTIVE |
| ROW 4: | INACTIVE |

| TIME PERIOD | (2X4) BUFFER 408 ACTIVITY |
|---|---|
| ROW 1: | INACTIVE |
| ROW 2: | RECEIVE AND STORE ROW 1-2 RESULTS FROM FILTER 406 |
| ROW 3: | INACTIVE |
| ROW 4: | TRANSMIT ROW 1-2 RESULTS TO FILTER 410 |

| TIME PERIOD | (4X4) FILTER 410 ACTIVITY |
|---|---|
| ROW 1: | INACTIVE |
| ROW 2: | INACTIVE |
| ROW 3: | INACTIVE |
| ROW 4: | RECEIVE ROW 1-2 RESULTS FROM BUFFER 408, RECEIVE ROW 3 RESULTS FROM BUFFER 404, RECEIVE ROW 4 RESULTS FROM FILTER 402, FILTER ROW 1-4 RESULTS, TRANSMIT ROW 1-4 RESULTS TO FILTER 412 |

FIG. 6

| TIME PERIOD | (1X2) FILTER 412 ACTIVITY |
|---|---|
| ROWS 1-3: | INACTIVE |
| ROW 4: | RECEIVE ROW 1-4 RESULTS FROM FILTER 410, FILTER ROW 1-4 RESULTS, TRANSMIT ROW 1-4 RESULTS TO BUFFER 414 |
| ROWS 5-7: | INACTIVE |
| ROW 8: | RECEIVE ROW 5-8 RESULTS FROM FILTER 410, FILTER ROW 5-8 RESULTS, TRANSMIT ROW 5-8 RESULTS TO FILTER 416 |

| TIME PERIOD | (1X2) BUFFER 414 ACTIVITY |
|---|---|
| ROWS 1-3: | INACTIVE |
| ROW 4: | RECEIVE AND STORE ROW 1-4 RESULTS FROM FILTER 412 |
| ROWS 5-7: | INACTIVE |
| ROW 8: | TRANSMIT ROW 1-4 RESULTS TO FILTER 416 |

| TIME PERIOD | (2X2) FILTER 416 ACTIVITY |
|---|---|
| ROWS 1-7: | INACTIVE |
| ROW 8: | RECEIVE ROW 1-4 RESULTS FROM BUFFER 414, RECEIVE ROW 5-8 RESULTS FROM FILTER 412, FILTER ROW 1-8 RESULTS, TRANSMIT ROW 1-8 RESULTS TO FILTER 418 |

FIG. 7

| TIME PERIOD | (1X2) FILTER 418 ACTIVITY |
|---|---|
| ROWS 1-7: | INACTIVE |
| ROW 8: | RECEIVE ROW 1-8 RESULTS FROM FILTER 416, FILTER ROW 1-8 RESULTS, TRANSMIT ROW 1-8 RESULTS TO BUFFER 420 |
| ROWS 9-15: | INACTIVE |
| ROW 16: | RECEIVE ROW 9-16 RESULTS FROM FILTER 416, FILTER ROW 9-16 RESULTS, TRANSMIT ROW 9-16 RESULTS TO FILTER 422 |

| TIME PERIOD | (1X2) BUFFER 420 ACTIVITY |
|---|---|
| ROWS 1-7: | INACTIVE |
| ROW 8: | RECEIVE AND STORE ROW 1-8 RESULTS FROM FILTER 418 |
| ROWS 9-15: | INACTIVE |
| ROW 16: | TRANSMIT ROW 1-8 RESULTS TO FILTER 422 |

| TIME PERIOD | (2X2) FILTER 422 ACTIVITY |
|---|---|
| ROWS 1-15: | INACTIVE |
| ROW 16: | RECEIVE ROW 1-8 RESULTS FROM BUFFER 420, RECEIVE ROW 9-16 RESULTS FROM FILTER 422, FILTER ROW 1-16 RESULTS, TRANSMIT ROW 1-16 RESULTS TO FILTER 424 AND MUX 430 |

FIG. 8

| TIME PERIOD | (1X2) FILTER 424 ACTIVITY |
|---|---|
| ROWS 1-15: | INACTIVE |
| ROW 16: | RECEIVE ROW 1-16 RESULTS FROM FILTER 422, FILTER ROW 1-16 RESULTS, TRANSMIT ROW 1-16 RESULTS TO BUFFER 426 |
| ROWS 17-31: | INACTIVE |
| ROW 32: | RECEIVE ROW 17-32 RESULTS FROM FILTER 422, FILTER ROW 17-32 RESULTS, TRANSMIT ROW 17-32 RESULTS TO FILTER 428 |

| TIME PERIOD | (1X2) BUFFER 426 ACTIVITY |
|---|---|
| ROWS 1-15: | INACTIVE |
| ROW 16: | RECEIVE AND STORE ROW 1-16 RESULTS FROM FILTER 424 |
| ROWS 17-31: | INACTIVE |
| ROW 32: | TRANSMIT ROW 1-16 RESULTS TO FILTER 428 |

| TIME PERIOD | (2X2) FILTER 428 ACTIVITY |
|---|---|
| ROWS 1-31: | INACTIVE |
| ROW 32: | RECEIVE ROW 1-16 RESULTS FROM BUFFER 426, RECEIVE ROW 17-32 RESULTS FROM FILTER 424, FILTER ROW 1-32 RESULTS, TRANSMIT ROW 1-32 RESULTS TO MUX 430 |

5,524,068

METHOD AND APPARATUS FOR FINDING AREAS OF INTEREST IN IMAGES

This is a continuation of application Ser. No. 07/935,152 filed on Aug. 21, 1992, now abandoned.

BACKGROUND OF THE INVENTION

1. Field of the Invention

The present invention relates to finding areas of interest in images, and to methods and apparatuses for finding areas or regions of interest in two-dimensional gray-scale images. More particularly, the present invention relates to methods and apparatuses for finding barcode symbols in static or dynamically evolving two-dimensional gray-scale images.

2. Statement of Related Art

In the field of package shipping, barcode symbols encode information about packages. One or more of these barcode symbols are printed on shipping labels that are affixed to packages. These barcode symbols may then be "read" using label reading systems. In some applications, packages are required to be processed in real time under conditions that are not well suited for conventional laser-based label reading systems. Such applications require large depths and fields of view as well as the ability to process randomly oriented labels. For example, a fixed barcode scanner positioned above a moving conveyor belt may be required to find and decode barcode symbols on labels affixed to packages that pass under the scanner. These barcode symbols may be randomly oriented and positioned within the scanner's field of view at various distances from the scanner. When employed in connection with such applications, conventional laser-based label reading systems may not have sufficient depth and field of view.

SUMMARY OF THE INVENTION

The present invention is a method and apparatus for finding an area of interest in an input image. The input image is filtered with at least one compression filter to generate a final compressed image. The location of an artifact in the final compressed image is determined, and then the location of the area of interest in the input image is determined according to the location of the artifact in the final compressed image.

In a preferred embodiment, the present invention comprises a method and apparatus for finding one or more artifacts in a two-dimensional image. A first row of the image is received and a list of regions is generated in accordance with the first row. The apparatus receives a next row of the image and updates the list of regions in accordance with the next row. The apparatus determines whether a region in the list of regions corresponds to an artifact in the image and, if so, selects the region as the artifact.

BRIEF DESCRIPTION OF THE DRAWINGS

FIG. 5 presents a timing table showing the processing activities performed by the filters and buffers that implement the (4×4) MIN compression filter of the preferred sequence of compression filters implemented by the circuit of FIG. 4;

FIG. 6 presents a timing table showing the processing activities performed by the filters and buffers that implement the first (2×2) MIN compression filter of the preferred sequence of compression filters implemented by the circuit of FIG. 4;

FIG. 7 presents a timing table showing the processing activities performed by the filters and buffers that implement the second (2×2) MIN compression filter of the preferred sequence of compression filters implemented by the circuit of FIG. 4;

FIG. 8 presents a timing table showing the processing activities performed by the filters and buffers that implement the (2×2) MAX compression filter of the preferred sequence of compression filters implemented by the circuit of FIG. 4;

DETAILED DESCRIPTION OF THE INVENTION

The present invention processes input images to select one or more sub-images that may contain areas of interest such as barcode symbols. Barcode symbol detection and decoding algorithms are then applied only to the smaller sub-images, thereby dramatically reducing the overall time required to detect and decode barcode symbols. Thus, the present invention enables a label reading system to locate and decode barcode symbols printed on shipping labels at the high rates required in the field of package shipping.

The system of the present invention for finding an area of interest in an input image begins by compressing the input image with one or more filters to generate a binary final compressed image. At least one of the filters is a compression filter. One of the filters may also be a thresholding filter. The system determines the location of artifacts in the final compressed image, and then, using those locations, identifies sub-images of the input image that correspond to the artifacts. An artifact is a region in the final compressed image that represents an area of interest, such as a barcode symbol, in the input image.

Figure 1:
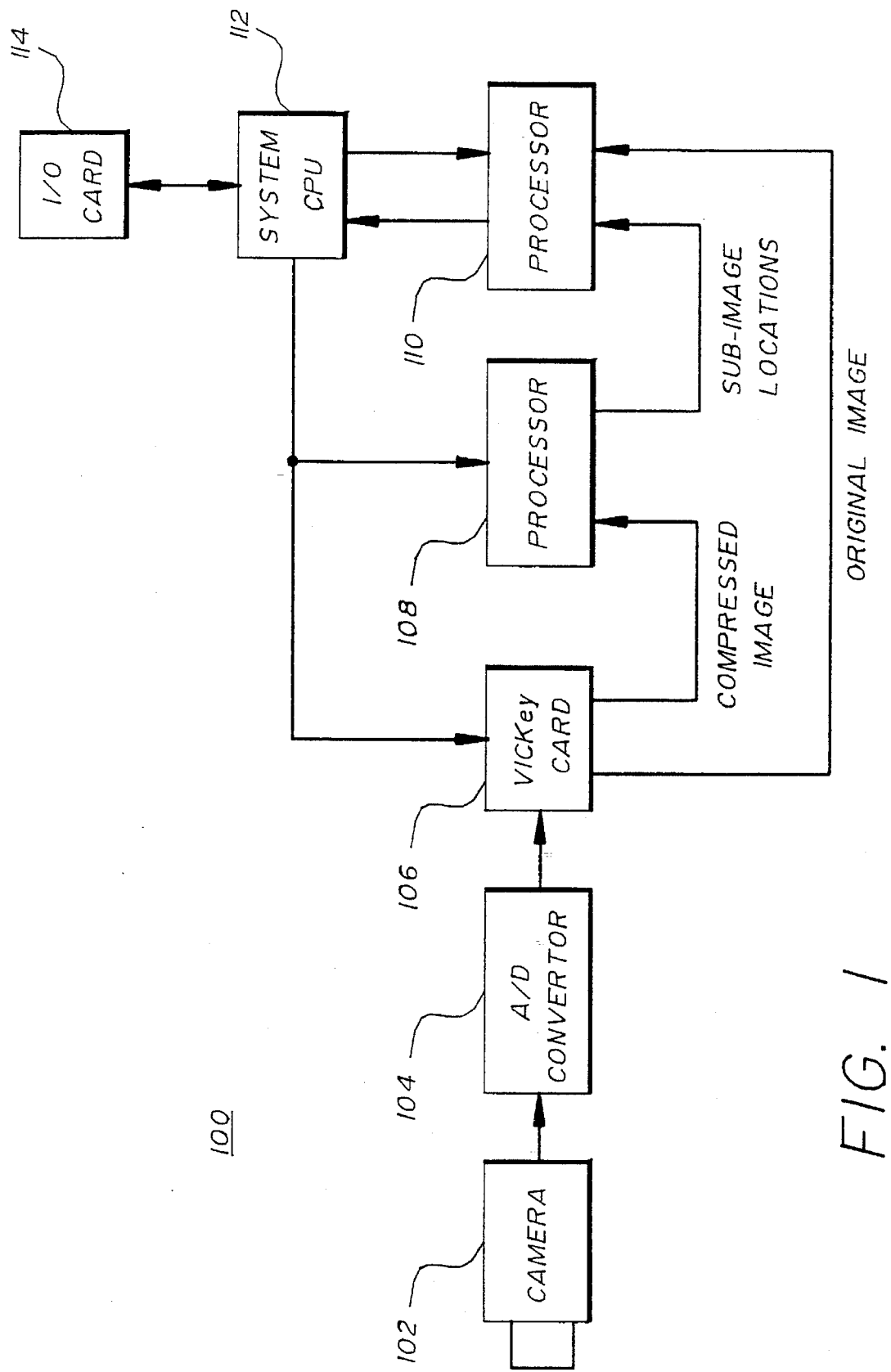
FIG. 1 presents a block diagram of a barcode symbol location system for finding barcode symbols in two-dimensional gray-scale input images according to a preferred embodiment of the present invention.

FIG. 1 presents a block diagram of a preferred embodiment of a barcode symbol location system 100 for finding areas of interest in two-dimensional gray-scale input images according to the present invention. The areas of interest may be barcode symbols, which comprise sequences of black bars and white spaces. The black bars of barcode symbols are represented in the input images by dark pixels typically having relatively low intensity levels, and white spaces are represented by bright pixels typically having relatively high intensity levels. The barcode symbols may have random and unknown locations and orientations in the input images.

Location system 100 applies thresholding and compression filters to a gray-scale input image containing one or more barcode symbols to create a binary final compressed image in which each barcode symbol in the input image is represented by one isolated, contiguous black region in the final compressed image, and each isolated, contiguous black region in the final compressed image represents at most one barcode symbol in the input image. In the binary final compressed image, white pixels have a value of "1" and black pixels have a value of "0". A black region in the final compressed image is a set of one or more black pixels.

A black region is contiguous if every black pixel in the set is "connected" to at least one other black pixel in the set. In a preferred embodiment, "connected" is defined in terms of four-way connectivity. That is, two pixels are connected, if they have a common side. A contiguous black region may have "holes," that is, one or more white pixels in the interior of the region. Two contiguous black regions are isolated if none of their black pixels are connected to black pixels in the other region. Thus, location system 100 transforms a gray-scale input image into a binary final compressed image in which each barcode symbol in the input image is represented by a set of black pixels in the final compressed image that are connected to each other, but are not connected to black pixels that represent a different barcode symbol in the input image.

Location system 100 characterizes all of the black regions in the final compressed image. If a black region meets specific geometry requirements dictated by the size and shape of an expected barcode symbol, then the region may represent a barcode symbol. Such a region is selected to represent a "candidate" barcode symbol. Location system 100 then determines the coordinates of a sub-image in the input image that corresponds to each selected region in the final compressed image. A decoding subsystem may then efficiently process each sub-image to determine whether each candidate barcode symbol is a true barcode symbol, and, if so, decode it. Areas of interest other than barcode symbols may also be represented in the final compressed image as isolated, contiguous black regions.

Location system 100 includes camera 102, which is preferably a CCD camera that generates in serial output format analog pixel signals corresponding to two-dimensional analog images with a pixel resolution of less than 100 pixels per inch. Camera 102 may comprise either a line-type or array-type CCD chip, such as a 4096-pixel Linear Image Sensor Array (Model IL-C 5-4096 "TURBOSENSOR") manufactured by DALSA Inc. of Waterloo, Ontario, Canada, or a 4096-pixel linear CCD Image Sensor (Model TH7833) manufactured by Thomson. Camera 102 may be used to generate analog images containing representations of package labels or other surfaces displaying barcode symbols. Camera 102 transmits the analog pixel signals of the analog images to analog-to-digital convertor 104.

In alternative preferred embodiments, a location system according to the present invention may be designed to locate areas of interest other than barcode symbols. For example, a location system may be designed to locate areas of interest representative of other symbologies such as "UPSCODE", "VERICODE", "DATA CODE", and "PDF417", as well as other one- and two-dimensional symbologies. "UPSCODE" is a registered trademark of United Parcel Service of America, Inc. Details of the "UPSCODE" symbology are disclosed in U.S. Pat. Nos. 4,874,936, 4,896,029, and 4,998,010, which are hereby incorporated herein in their entirety by reference. Details of the "VERICODE" and "DATA CODE" symbologies are disclosed in U.S. Pat. Nos. 4,924,078 and 4,939,154, which are hereby incorporated herein in their entirety by reference. In addition, location systems within the scope of the present invention may be designed to locate areas of interest such as individual characters, or sets of characters such as individual words or paragraphs, in input images. Depending on the application, a location system of the present invention may include a CCD-array camera with a resolution greater than or smaller than 100 pixels per inch.

Analog-to-digital convertor 104 of location system receives the analog pixel signals of an analog image from camera 102 and digitizes them into 8-bit pixels of a two-dimensional gray-scale input image. A/D convertor 104 then applies a thresholding filter to threshold each 8-bit pixel of the input image into a binary pixel of a first thresholded image. In a preferred embodiment, A/D convertor 104 applies an adaptive thresholding filter to generate the binary pixels of the first thresholded image. In an alternative preferred embodiment, A/D convertor 104 applies a multi-pole analog filter to generate these binary pixels. A/D convertor 104 transmits both the 8-bit pixels of the input image and the binary pixels of the first thresholded image to VICKey card 106. In a preferred embodiment, in each processor cycle, A/D convertor 104 transmits to VICKey card 106 a pair of adjacent 8-bit pixels from the input image and the two corresponding binary pixels from the first thresholded image.

VICKey card 106 is preferably a digital logic board with buffer memory. VICKey is an acronym for "VSB Interface Controller Key," where VSB stands for VME Subsystem Bus. VICKey card 106 performs data conversion, manipulation, reformatting, and transfer to provide interfacing of input with output. VICKey card 106 also applies a thresholding filter to convert each 8-bit pixel of the input image into a binary pixel of a second thresholded image. As described in greater detail later in this specification in conjunction with FIG. 2, a system CPU command determines whether the first thresholded image or the second thresholded image is selected for further processing. VICKey card 106 applies a sequence of compression filters to the selected thresholded image to generate a final compressed image. The thresholding and compression filters transform an input image having barcode symbols or other areas of interest into a final compressed image having isolated, contiguous black regions, where each barcode symbol or other area of interest in the input image is represented by a different isolated, contiguous black region in the final compressed image. VICKey card 106 outputs the gray-scale input image and the final compressed image to a VSB Bus. Processor 108 reads the final compressed image and processor 110 reads the gray-scale input image from the VSB Bus.

Processor 108 is a reduced instruction set computer (RISC) processor that implements software for determining the location of artifacts in the final compressed image. The artifacts are isolated, contiguous black regions in the final compressed image that meet specific geometry requirements and may therefore represent barcode symbols or other areas of interest in the input image. Processor 108 is preferably a "SUPERCARD2" brand i860 CPU RISC processor, manufactured by Computer Signal Processors, Inc. (CSPI).

Processor 108 receives the final compressed image from VICKey card 106, determines the locations of the compressed barcode symbols or other areas of interest in the final compressed image, and then uses those locations to determine the coordinates of sub-images in the input image that contain candidate barcode symbols or other candidate areas of interest. The sub-image coordinates are then transmitted to processor 110. The coordinates of a sub-image in the input image are preferably represented by the two rows and two columns that form the boundary of the sub-image. For example, in a (512×512) input image, rows 20 and 80 and columns 100 and 180 may represent the rectangular (61×81) sub-image in the input image bounded by rows 20 and 80 and columns 100 and 180.

Processor 110 is a RISC processor that implements software for identifying and decoding the candidate barcode symbols contained in the sub-images of the input image selected by processor 108. Like processor 108, processor 110 is preferably a "SUPERCARD2" brand i860 CPU RISC processor, manufactured by CSPI. Processor 110 receives from processor 108 the coordinates for the sub-images in the input image that contain candidate barcode symbols, processes each sub-image to identify the true barcode symbols, decodes the barcode symbols, and transmits the decoded barcode symbol data to system CPU 112. Processor 110 is preferably implemented by the barcode detector and decoder described in the U.S. patent application entitled "Method and Apparatus for Detecting and Decoding Barcode Symbols," filed Aug. 10, 1992, now U.S. Pat. No. 5,343,028, invented by Luis Figarella and Mihael Klancnik, in the U.S. patent application Ser. No. 08/215,900, entitled "Method and Apparatus for Decoding Barcode Symbols Using Sub-pixel Interpolation," filed Aug. 10, 1992, invented by Mihael Klancnik and Luis Figarella, and in the U.S. patent application entitled "Method and Apparatus for Detecting Artifact Corners in Two-Dimensional Images," filed Aug. 10, 1992, now U.S. Pat. No. 5,418,862, invented by Joe Zheng and Mihael Klancnik, which are all assigned to the assignee of the present application and the contents of which are all incorporated herein by reference. System CPU 112 controls the operations of location system 100 and interfaces with input/output card 114, which provides a user interface.

DETAILED DESCRIPTION OF VICKey CARD

Figure 2:
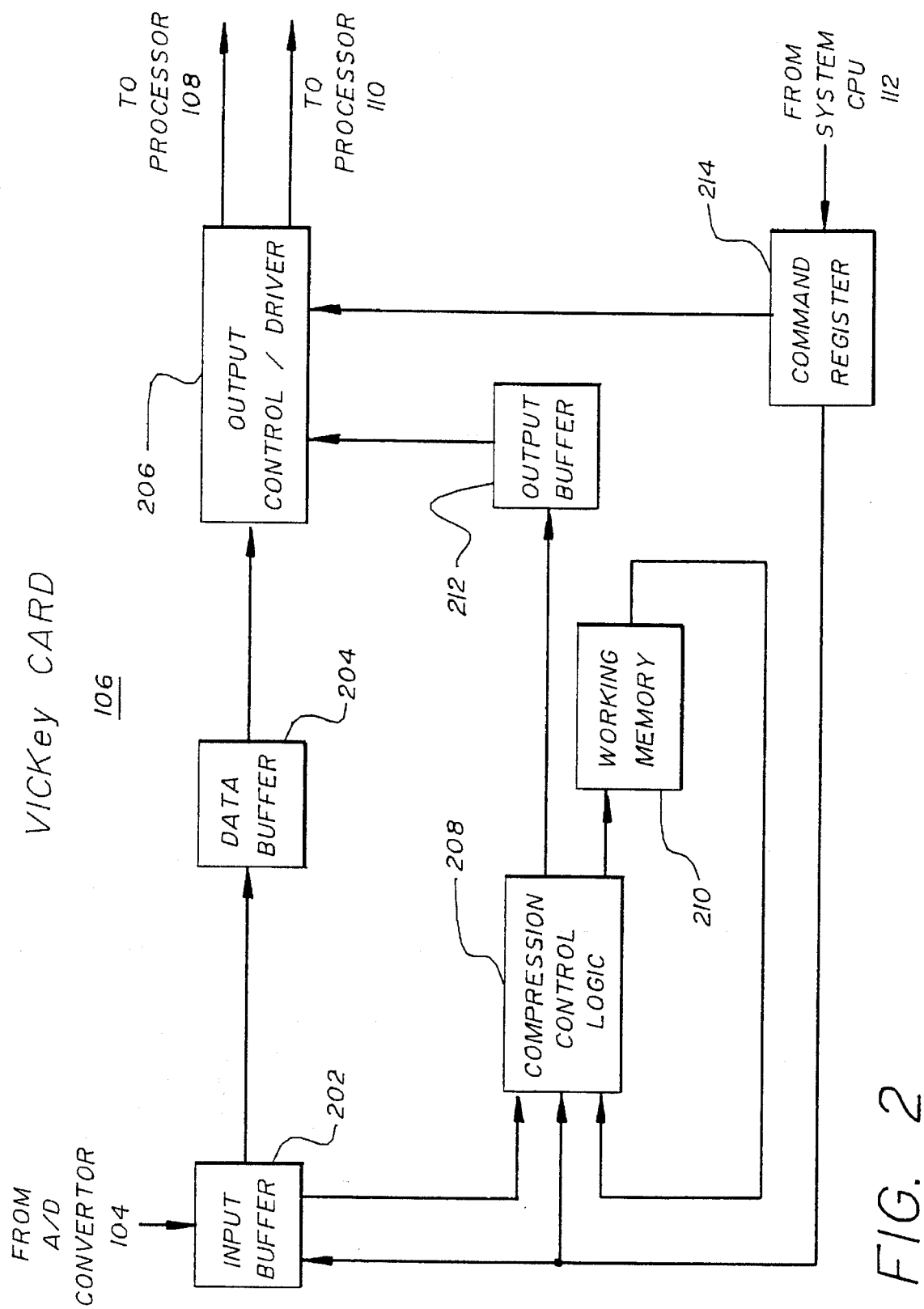
FIG. 2 presents a block diagram of the VICKey card of the location system of FIG. 1.

FIG. 2 presents a block diagram of VICKey card 106 of location system 100 according to a preferred embodiment of the present invention. Command register 214 receives from system CPU 112 the command and control signals that control the operations of VICKey card 106. Command register 214 transmits the appropriate commands and control signals to input buffer 202, compression control logic 208, and output control/driver 206. These commands and control signals will be explained in greater detail later in this section in conjunction with descriptions of these system components.

In each processor cycle, input buffer 202 of VICKey card 106 receives from A/D convertor 104 a pair of adjacent 8-bit pixels from the input image and the two corresponding binary pixels from the first thresholded image. Input buffer 202 transmits the two 8-bit pixels to data buffer 204, which accumulates and eventually transmits the 8-bit pixels to output control/driver 206. Output control/driver 206 then transmits the 8-bit pixels to processor 110.

Input buffer 202 thresholds each pair of 8-bit pixels to create a pair of binary pixels using a threshold specified by a command from system CPU 112 and directed to input buffer 202 by command register 214. These binary pixels correspond to the second thresholded image. Another system CPU command determines whether the first or the second thresholded image is to be selected for further processing. Input buffer 202 transmits to compression control logic 208 the two binary pixels corresponding to whichever thresholded image is selected.

Compression control logic 208 applies a sequence of compression filters to the selected thresholded image to create a final compressed image. In a preferred embodiment, compression control logic 208 can apply a sequence of either three or four filters. The fourth filter is an optional filter that may be activated or inactivated by a system-CPU command directed from system CPU 112 to compression control logic 208 by command register 214. The first filter in the sequence is a (4×4) compression filter that reduces each non-overlapping (4×4) pixel area of the selected thresholded image to a single binary pixel of a first compressed image.

The second filter in the sequence is a first (2×2) compression filter that reduces each non-overlapping (2×2) pixel area of the first compressed image to a single binary pixel of a second compressed image. The third filter in the sequence is a second (2×2) compression filter that reduces each non-overlapping (2×2) pixel area of the second compressed image to a single binary pixel of a third compressed image. The fourth filter in the sequence is a third (2×2) compression filter that reduces each non-overlapping (2×2) pixel area of the third compressed image to a single binary pixel of a fourth compressed image.

When all four filters are activated, the final compressed image is the fourth compressed image and the numbers of rows and columns in the selected thresholded image are both reduced by a compression ratio of 32. That is, an input image that has 2048 rows of 8-bit pixels with 4096 pixels/row is compressed into a (64×128) final compressed image comprised of binary pixels. When the last filter is deactivated, the final compressed image is the third compressed image and the compression ratio is 16 in each direction.

In addition to being able to activate or deactivate the fourth filter, each filter may be independently selected to be either a MAX filter or a MIN filter based on system-CPU commands directed from system CPU 112 to compression control logic 208 by command register 214. A MAX filter applies an "OR" function to replace the binary pixels of a selected pixel area with a single 1-bit result corresponding to a binary pixel, where a white pixel is represented by a "1", and a black pixel, by a "0". In other words, if any binary pixel in the pixel area is "1" (white), the result of a MAX filter is a "1". If all of the binary pixels in the pixel area are "0" (black), then the result of a MAX filter is a "0". Similarly, a MIN filter applies an "AND" function to each pixel area. A MIN filter generates a "1" only if all binary pixels in the pixel area are white; otherwise, a MIN filter generates a "0".

In a preferred embodiment, the fourth filter is activated and compression control logic 208 applies a sequence of four filters where the first filter is a (4×4) MIN filter, the second and third filters are (2×2) MIN filters, and the fourth filter is a (2×2) MAX filter. This sequence was selected empirically using test input images that are similar to input images containing barcode symbols to be located in a particular application.

Those skilled in the art will understand that, in alternative embodiments of the present invention, compression control logic 208 may apply alternative sequences of filters. These alternative sequences may include different numbers of filters, different sizes of filters, and different types of filters. MIN and MAX filters are particular types of voting scheme filters. Alternative embodiments of the present invention may employ voting scheme filters other than MIN and MAX filters. In an alternative preferred embodiment, compression control logic 208 applies more robust filtering that may include nearest neighbor influences. Moreover, not all filters in the sequence need to be compression filters. The selection of the sequence of filters to use for a particular application (e.g., to locate areas of interest corresponding to barcode, "UPSCODE", "VERICODE", "DATA CODE", or "PDF417" symbologies) may be made empirically by performing off-line analysis in which different filters and different sequences of filters are applied to test input images representative of input images expected in the particular application.

The preferred filtering sequence described above is selected to produce artifacts in a final compressed image, where each barcode symbol in the input image is represented by a single artifact in the final compressed image and each artifact represents only one candidate barcode symbol. That is, the thresholding and compression filtering preferably "grows" the individual black bars of a barcode symbol into a single black region in the final compressed image, while keeping the compressed barcode symbol isolated from other artifacts that may represent other barcode symbols or other areas of interest in the input image. A "compressed barcode symbol" is a set of binary pixels in a compressed image that represents a particular barcode symbol in the input image used to generate the compressed image. Those skilled in the art will understand that it is acceptable to include, in the compressed barcode symbol, compressed representations of the alphanumeric characters that are typically displayed immediately below some barcode symbols.

In a preferred pipeline embodiment, compression control logic 208 begins to apply the selected sequence of compression filters as soon as it receives from input buffer 202 the first pair of binary pixels in the first row of the selected thresholded image. Each compression filter operates on either (4×4) or (2×2) pixel areas. Compression control logic 208 begins applying these two-dimensional filters before the entire pixel areas to which the filters are applied are received or generated. Compression control logic 208 then transmits partial results from the compression filters to working memory 210. Working memory 210 stores the partial results until compression control logic 208 accesses them for the on-going sequence of compression filtering. Compression control logic 208 also transmits a serial stream of binary pixels corresponding to the final compressed image to output buffer 212. This preferred pipeline embodiment is described in further detail later in this specification in conjunction with FIG. 4.

Output buffer 212 receives the serial stream of binary pixels from compression control logic 208, reformats that data into a parallel stream, and transmits the parallel data to output control/driver 206. Output control/driver 206 transmits the binary pixels of the final compressed image to processor 108.

Preferred Snapshot Embodiment

In alternative preferred embodiments, location system 100 processes input images using different procedures. These embodiments include a snapshot embodiment, a partial snapshot embodiment, and a pipeline embodiment. In a preferred snapshot embodiment, location system 100 generates an entire input image and then processes the input image by applying each two-dimensional compression filter to an entire image. A snapshot embodiment may be useful in situations in which single images are to be processed, and storage space and processing time are amply available.

An exemplary input image having 2048 rows of 4096 pixels/row is used to facilitate the description of a snapshot embodiment. Location system 100 generates a (2048×4096) selected thresholded image from the (2048×4096) input image. After the selected thresholded image is completely generated, location system 100 then applies a (4×4) MIN compression filter to each non-overlapping (4×4) pixel area of the selected thresholded image to generate a (512×1024) first compressed image. After the first compressed image is completely generated, location system 100 then applies a first (2×2) MIN compression filter to each non-overlapping (2×2) pixel area of the first compressed image to generate a (256×512) second compressed image. After the second compressed image is completely generated, location system 100 then applies a second (2×2) MIN compression filter to each non-overlapping (2×2) pixel area of the second compressed image to generate a (128×256) third compressed image. After the third compressed image is completely generated, location system 100 then applies a (2×2) MAX compression filter to each non-overlapping (2×2) pixel area of the third compressed image to generate a (64×128) fourth and final compressed image. The complete final compressed image may then be analyzed to locate candidate barcode symbols for eventual identification and decoding.

Preferred Partial Snapshot Embodiment

In a preferred partial snapshot embodiment, location system 100 accumulates partial snapshots of images and applies each two-dimensional compression filter to pixel areas of those partial snapshots. In this embodiment, after each (4×4096) subimage of a (2048×4096) selected thresholded image is generated, location system 100 applies a (4×4) MIN compression filter to each non-overlapping (4×4) pixel area of the (4×4096) sub-image to generate a single row of a (512×1024) first compressed image. After each (2×1024) sub-image of the first compressed image is generated, location system 100 applies a first (2×2) MIN compression filter to each non-overlapping (2×2) pixel area of the (2×1024) sub-image to generate a single row of a (256×512) second compressed image. After each (2×512) sub-image of the second compressed image is generated, location system 100 applies a second (2×2) MIN compression filter to each non-overlapping (2×2) pixel area of the (2×512) sub-image to generate a single row of a (128×256) third compressed image. After each (2×256) sub-image of the third compressed image is generated, location system 100 applies a (2×2) MAX compression filter to each non-overlapping (2×2) pixel area of the (2×256) sub-image to generate a single row of a (64×128) fourth and final compressed image.

Figure 3:
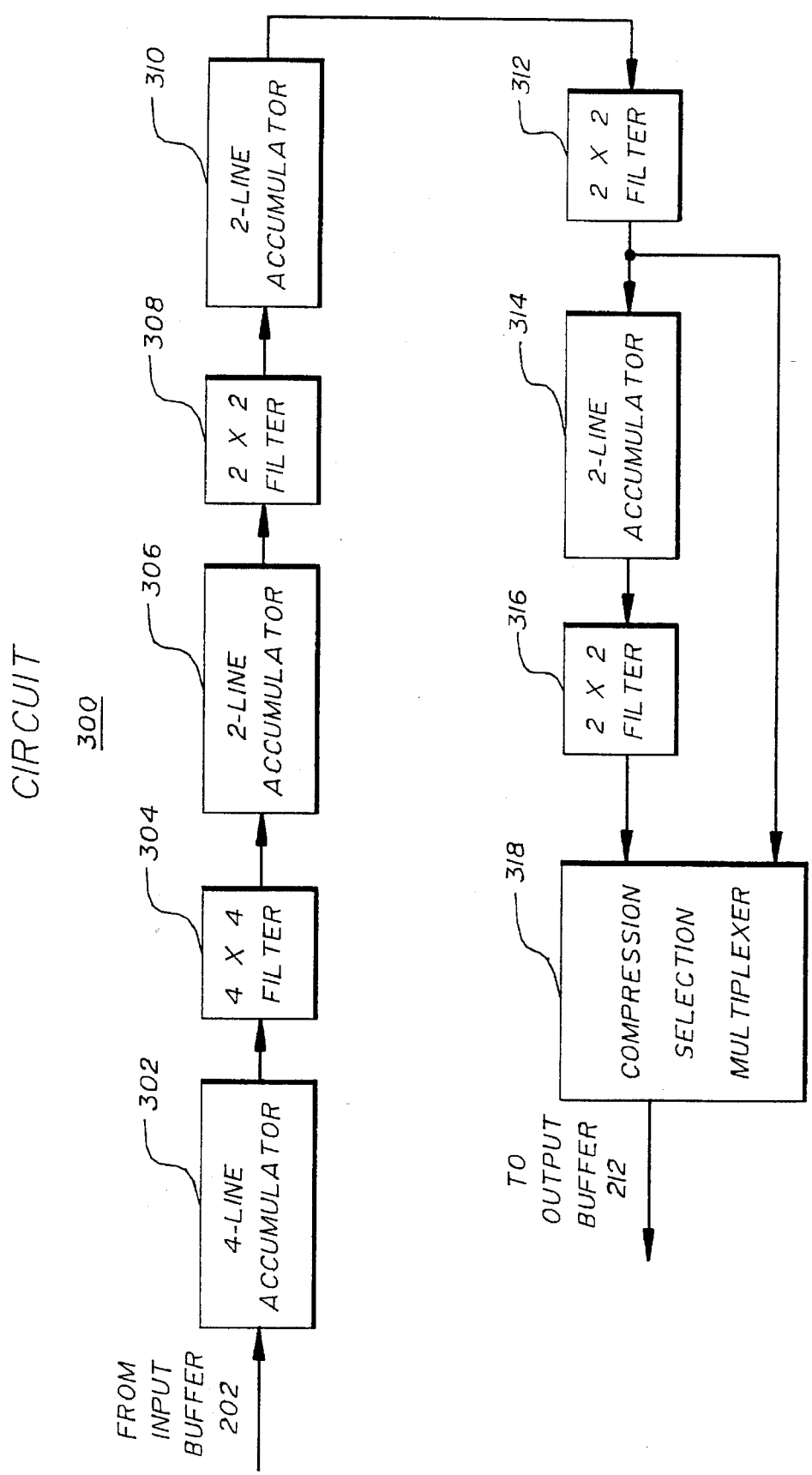
FIG. 3 presents a block diagram of a circuit that is a preferred partial snapshot embodiment of the compression control logic and the working memory of the VICKey card of the location system of FIG. 1.

FIG. 3 presents a block diagram of circuit 300, which is a preferred partial snapshot embodiment of compression control logic 208 and working memory 210 of VICKey card 106. To facilitate the description of circuit 300 of FIG. 3, the example of a (2048×4096) selected thresholded image from the discussion of the snapshot embodiment of the previous section is used. In each processor cycle, 4-line accumulator 302 receives from input buffer 202 of VICKey card 106 a pair of adjacent binary pixels from the selected thresholded image. Accumulator 302 accumulates those binary pixels until four rows of the selected thresholded image are received, at which time, accumulator 302 transmits all four rows to (4×4) filter 304. Accumulator 302 then begins to accumulate binary pixels from the next four rows of the selected thresholded image for similar subsequent transmission to filter 304.

The four rows received by (4×4) filter 304 from accumulator 302 correspond to a (4×4096) pixel area of the selected thresholded image. Filter 304 applies a (4×4) compression filter to each of the 1024 non-overlapping (4×4) pixel areas of the (4×4096) pixel area. Filter 304 is preferably selected to be a MIN filter. Filter 304 compresses each (4×4096) pixel area of the selected thresholded image into a (1×1024) row of a first compressed image. Filter 304 transmits the (1×1024) row serially to 2-line accumulator 306. Filter 304 effectively compresses the (2048×4096) selected thresholded image to a (512×1024) first compressed image.

2-line accumulator 306 receives binary pixels from (4×4) filter 304 until two rows of the first compressed image are accumulated, at which time, accumulator 306 transmits the two rows to (2×2) filter 308. The two rows received by (2×2) filter 308 from accumulator 306 correspond to a (2×1024) pixel area of the first compressed image generated by filter 304. Filter 308 applies a (2×2) compression filter to each of the 512 non-overlapping (2×2) pixel areas of the (2×1024) pixel area. Filter 308 is preferably selected to be a MIN filter. Filter 308 compresses each (2×1024) pixel area of the first compressed image into a (1×512) row of a second compressed image. Filter 308 transmits the (1×512) row serially to 2-line accumulator 310. Filter 308 effectively compresses the (512×1024) first compressed image generated by filter 304 to a (256×512) second compressed image.

2-line accumulator 310 receives binary pixels from (2×2) filter 308 until two rows of the second compressed image are accumulated, at which time, accumulator 310 transmits the two rows to (2×2) filter 312. The two rows received by (2×2) filter 312 from accumulator 310 correspond to a (2×512) pixel area of the second compressed image generated by filter 308. Filter 312 applies a (2×2) compression filter to each of the 256 non-overlapping (2×2) pixel areas of the (2×512) pixel area. Filter 312 is preferably selected to be a MIN filter. Filter 312 compresses each (2×512) pixel area of the second compressed image into a (1×256) row of a third compressed image. Filter 312 transmits the (1×256) row serially to 2-line accumulator 314 and to compression selection multiplexer 318. Filter 312 effectively compresses the (256×512) second compressed image generated by filter 308 to a (128×256) third compressed image.

2-line accumulator 314 receives binary pixels from (2×2) filter 312 until two rows of the third compressed image are accumulated, at which time, accumulator 314 transmits the two rows to (2×2) filter 316. The two rows received by (2×2) filter 316 from accumulator 314 correspond to a (2×256) pixel area of the third compressed image generated by filter 312. Filter 316 applies a (2×2) compression filter to each of the 128 non-overlapping (2×2) pixel areas of the (2×256) pixel area. Filter 316 is preferably selected to be a MAX filter. Filter 316 compresses each (2×256) pixel area of the third compressed image into a (1×128) row of a fourth compressed image. Filter 316 transmits the (1×128) row serially to compression selection multiplexer 318. Filter 312 effectively compresses the (128×256) third compressed image generated by filter 312 to a (64×128) fourth compressed image.

If (2×2) filter 316, the fourth compression filter, is activated, then compression selection multiplexer 318 transmits to output buffer 212 binary pixels from filter 316 that correspond to the (64×128) fourth compressed image. Otherwise, multiplexer 318 transmits to output buffer 212 binary pixels from filter 312 corresponding to the (128×256) third compressed image. Filter 316 is preferably activated. The binary pixels transmitted by multiplexer 318 to output buffer 212 correspond to the final compressed image.

Preferred Pipeline Embodiment

In a preferred pipeline embodiment, location system 100 finds barcode symbols by processing input images in a pipelined manner, in which one pair of adjacent pixels is processed in each processor cycle. In one preferred pipeline embodiment, location system 100 operates at 20 MHz with a processor cycle period of 50 nanoseconds. In this embodiment, VICKey card 106 begins to apply the sequence of compression filters before the complete pixel areas on which the compression filters operate are received from A/D convertor 104.

In this preferred pipeline embodiment, camera 102 may be a video camera that generates a continuous stream of images that may collectively be considered to be one continuous image. When camera 102 is positioned above a moving conveyor belt, location system 100 may be operated in a continuous mode to find barcode symbols in this one continuous image. In this embodiment, pixel columns in the input image are aligned with the direction of motion of the conveyor belt with the bottom row of one input image followed by the top row of the next input image.

Figure 4:
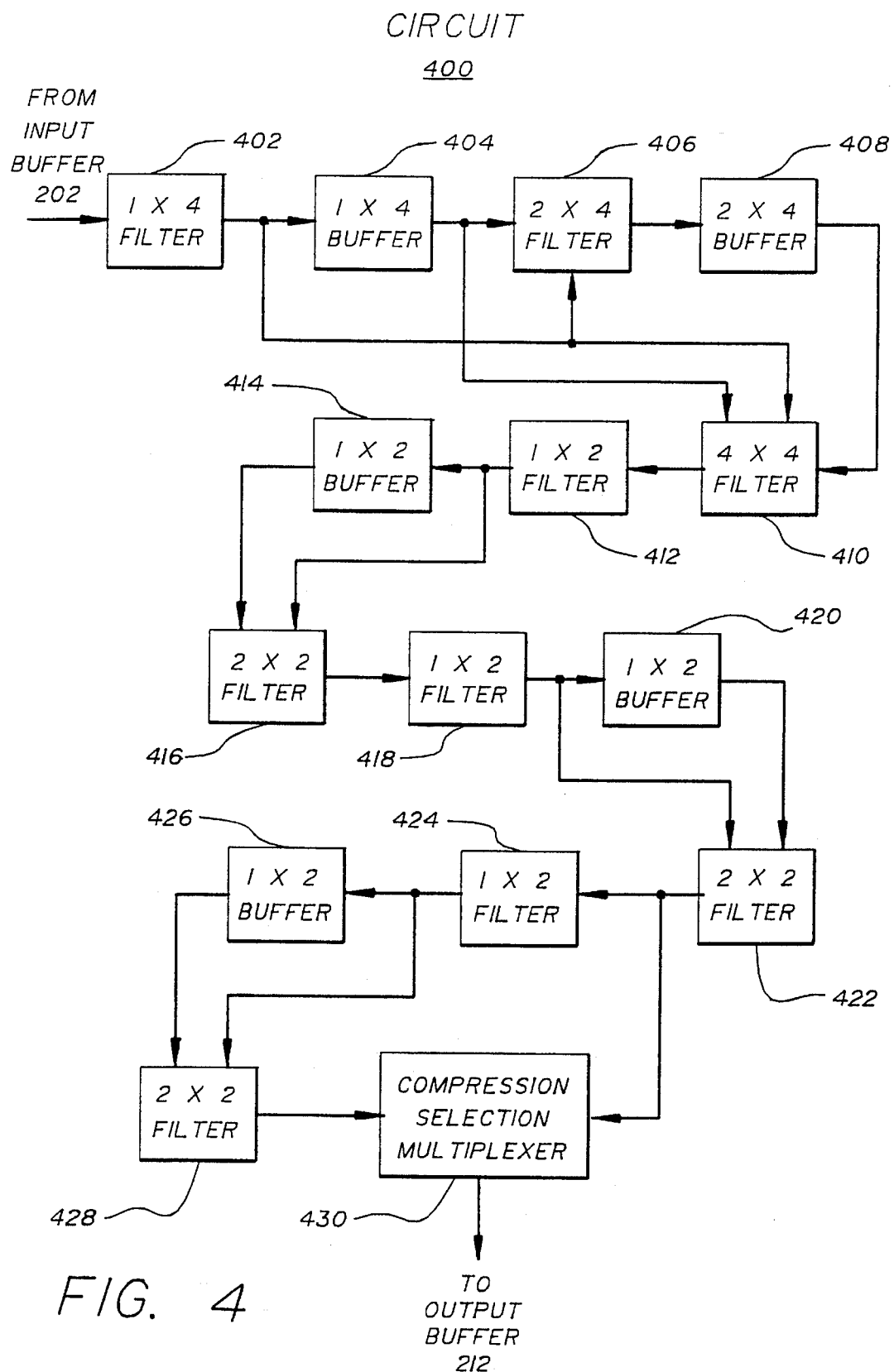
FIG. 4 presents a block diagram of a circuit that is a preferred pipeline embodiment of the compression control logic and the working memory of the VICKey card of the location system of FIG. 1.

FIG. 4 presents a block diagram of circuit 400, which is a preferred pipeline embodiment of compression control logic 208 and working memory 210. In this embodiment, location system 100 processes input images in a pipelined manner, where compression control logic 208 begins applying a selected sequence of compression filters as soon as a pair of adjacent binary pixels from the selected thresholded image is received from input buffer 202 of VICKey card 106. In this preferred embodiment with a processor cycle period of 50 nanoseconds, A/D convertor 104 transmits data to input buffer 202 at a rate of 20 megabytes per second.

Circuit 300 of FIG. 3 and circuit 400 of FIG. 4 are alternative preferred embodiments of compression control logic 208 and working memory 210 of VICKey card 106. Each circuit implements the preferred sequence of four compression filters. Acting together, filters 402, 406, and 410 of circuit 400 implement the same (4×4) MIN filter implemented by filter 304 of circuit 300. Buffers 404 and 408 temporarily store the results from filters 402 and 406, respectively. Similarly, filters 412 and 416 of circuit 400 act together to implement the first (2×2) MIN filter as implemented by filter 308 of circuit 300. Buffer 414 temporarily stores the results from filter 412. Filters 418 and 422 of circuit 400 together implement the second (2×2) MIN filter as implemented by filter 312 of circuit 300. Buffer 420 temporarily stores the results from filter 418. And lastly, filters 424 and 428 of circuit 400 act together to implement the (2×2) MAX filter implemented by filter 316 of circuit 300. Buffer 426 temporarily stores the results from filter 424.

Continuing with the example from the discussion of FIG. 3, a (2048×4096) selected thresholded image may be considered to comprise 512 (4×4096) 4-row pixel areas. As each row of the 4-row pixel areas is transmitted one after the other, two binary pixels at a time, from input buffer 202 to filter 402, circuit 400 processes the rows of the 4-row pixel areas. As circuit 400 processes a given row, each of the filters and buffers of circuit 400 is either inactive or performing specific functions.

FIG. 5 presents a timing table showing the processing activities performed by filters 402, 406, and 410 and buffers 404 and 408 during four time periods. The first time period, identified as "Row 1," corresponds to the time period during which the first row of a (4×4096) 4-row pixel area of a selected thresholded image is received by filter 402 from input buffer 202. The second time period, identified as "Row 2," follows immediately after the "Row 1" time period and corresponds to the time period during which the second row of the (4×4096) 4-row pixel area is received by filter 402 from input buffer 202.

Similarly, the third and fourth time periods, identified as "Row 3" and "Row 4," respectively, correspond to the time periods during which the third and fourth rows of the (4×4096) 4-row pixel area are received by filter 402 from input buffer 202. These four time periods repeat for each successive (4×4096) 4-row pixel area of the selected thresholded image. Where each row comprises 4096 binary pixels and where two binary pixels are transmitted from input buffer 202 to filter 402 every processor cycle, the "Row 1," "Row 2," "Row 3," and "Row 4" time periods are each 2048 processor cycles long.

In each processor cycle, (1×4) filter 402 receives from input buffer 202 a pair of adjacent binary pixels from the selected thresholded image. Filter 402 accumulates binary pixels for two processor cycles until four adjacent binary pixels are received. Since the (4×4) compression filter is preferably a MIN filter, filter 402 applies an "AND" function to the four binary pixels. Thus, if all four binary pixels are "1" (white), filter 402 generates a 1-bit result of "1"; otherwise, filter 402 generates a 1-bit result of "0". Filter 402 transmits a 1-bit result corresponding to four adjacent binary pixels every two processor cycles.

Filters 402, 406, and 410 and buffers 404 and 408 implement a (4×4) MIN compression filter on the (2048× 4096) selected thresholded image. During the "Row 1" time period, filter 402 transmits 1-bit results corresponding to the first row of a (4×4096) 4-row pixel area of a selected thresholded image to (1×4) buffer 404. During the "Row 2" time period, filter 402 transmits 1-bit results corresponding to the second row of the 4-row pixel area to (2×4) filter 406. During the "Row 3" time period, filter 402 transmits 1-bit results corresponding to the third row to buffer 404. And during the "Row 4" time period, filter 402 transmits 1-bit results corresponding to the fourth row to (4×4) filter 410.

During the "Row 1" time period, (1×4) buffer 404 receives 1-bit results corresponding to the first row of a (4×4096) 4-row pixel area of a selected thresholded image from (1×4) filter 402. Since filter 402 processes an entire row of binary pixels of the selected thresholded image before processing the next row, buffer 404 receives 1-bit results corresponding to an entire row of the selected thresholded image from filter 402. Every 1-bit result received by buffer 404 corresponds to four adjacent binary pixels in a row of the selected thresholded image. Where each row of the selected thresholded image has 4096 binary pixels, buffer 404 stores 1024 1-bit results.

During the "Row 2" time period, buffer 404 transmits to (2×4) filter 406 the 1024 stored 1-bit results corresponding to the first row at a rate of one bit every two processor cycles. During the "Row 3" time period, buffer 404 receives 1024 1-bit results corresponding to the third row from (1×4) filter 402. During the "Row 4" time period, buffer 404 transmits to (4×4) filter 410 the 1024 stored 1-bit results corresponding to the third row at a rate of one bit every two processor cycles.

During the "Row 1" time period, (2×4) filter 406 is inactive. During the "Row 2" time period, filter 406 receives, in every two processor cycles, a 1-bit result corresponding to the first row from buffer 404 and a 1-bit result corresponding to the second row from filter 402. These two 1-bit results correspond to a (2×4) pixel area in the first and second rows of the 4-row pixel area of the selected thresholded image. Filter 406 performs an "AND" operation on the two 1-bit results, and transmits to (2×4) buffer 408 a 1-bit result corresponding to the first and second rows of the 4-row pixel area at a rate of 1 bit every two processor cycles. During the "Row 3" and "Row 4" time periods, filter 406 is again inactive.

During the "Row 1" time period, (2×4) buffer 408 is inactive. During the "Row 2" time period, buffer 408 receives 1-bit results corresponding to the first and second rows of the 4-row pixel area from filter 406. Since each 1-bit result from filter 406 corresponds to a (2×4) pixel area in the first and second rows of the (4×4096) 4-row pixel area, buffer 408 stores 1024 1-bit results. During the "Row 3" time period, buffer 408 is again inactive. During the "Row 4" time period, buffer 408 transmits to (4×4) filter 410 the 1-bit results corresponding to the first and second rows at a rate of one bit every two processor cycles.

During the "Row 1," "Row 2" and "Row 3" time periods, (4×4) filter 410 is inactive. During the "Row 4" time period, filter 410 receives, in every two processor cycles, a 1-bit result corresponding to the first and second rows from buffer 408, a 1-bit result corresponding to the third row from buffer 404, and a 1-bit result corresponding to the fourth row from filter 402. These three 1-bit results correspond to a (4×4) pixel area in the 4-row pixel area. Filter 410 performs an "AND" operation on the three 1-bit results, and transmits to (1×2) filter 412 a 1-bit result corresponding to the four rows of the 4-row pixel area at a rate of 1 bit every two processor cycles.

Each 1-bit result generated by filter 410 corresponds to a non-overlapping (4×4) pixel area in a (4×4096) 4-row pixel area of the selected thresholded image. Filters 402, 406, and 410 and buffers 404 and 408 repeat this processing for each (4×4096) 4-row pixel area of the selected thresholded image. As such, filters 402, 406, and 410 and buffers 404 and 408 implement a (4×4) MIN compression filter that effectively compresses the (2048×4096) selected thresholded image to a (512×1024) first compressed image.

FIG. 6 presents a timing table showing the processing activities performed by filters 412 and 416 and buffer 414 of circuit 400, which implement a (2×2) MIN compression filter on the (512×1024) first compressed image. Each row of the (512×1024) first compressed image represents four rows of the (2048×4096) selected thresholded image. For example, the first row of the first compressed image represents the first, second, third, and fourth rows of the selected thresholded image. The second row of the first compressed image represents the fifth, sixth, seventh, and eighth rows of the selected thresholded image.

The time periods in FIG. 6 correspond to the time periods during which the specified rows of an (8×4096) 8-row pixel area of a selected thresholded image is received by filter 402 from input buffer 202. For example, the "Rows 1–3" time period corresponds to the time period during which the first three rows of the 8-row pixel area are received by filter 402 from input buffer 202. These time periods repeat for each successive (8×4096) 8-row pixel area of the selected thresholded image. Where each row comprises 4096 binary pixels and where two binary pixels are transmitted from input buffer 202 to filter 402 every processor cycle, a time period is equal to the number of corresponding rows times 2048 cycles. For example, the "Rows 5–7" time period corresponds to three rows of the selected thresholded image and is 6144 processor cycles long.

The (512×1024) first compressed image may be considered to comprise 256 (2×1024) 2-row pixel areas. During the "Row 4" time period, filters 412 and 416 and buffer 414 process the first row of a (2×1024) 2-row pixel area of the first compressed image. Similarly, during the "Row 8" time period, filters 412 and 416 and buffer 414 process the second row of the (2×1024) 2-row pixel area.

In every two processor cycles, (1×2) filter 412 receives from filter 410 a binary pixel from the first compressed image. Filter 412 accumulates binary pixels for four processor cycles until two adjacent binary pixels are received. These two binary pixels correspond to a (1×2) pixel area in the first compressed image and represent a (4×8) pixel area in the selected thresholded image. Filter 412 then applies an "AND" function to the two binary pixels and transmits a 1-bit result every four processor cycles. During the "Rows 1–3" time period, filter is inactive. During the "Row 4" time period, filter 412 transmits 1-bit results corresponding to the first row of a (2×1024) 2-row pixel area of the first compressed image to (1×2) buffer 414. During the "Rows 5–7" time period, filter 412 is again inactive. During the "Row 8" time period, filter 412 transmits 1-bit results corresponding to the second row of the (2×1024) 2-row pixel areas to (2×2) filter 416.

During the "Rows 1–3" time period, (1×2) buffer 414 is inactive. During the "Row 4" time period, (1×2) buffer 414 receives 1-bit results corresponding to the first row of a (2×1024) 2-row pixel area of the first compressed image from filter 412. Since each 1-bit result from filter 412 corresponds to two adjacent binary pixels in a row of the (512×1024) first compressed image, buffer 414 stores 512 1-bit results. During the "Rows 5–7" time period, buffer 414 is again inactive. During the "Row 8" time period, buffer 414 transmits the 1-bit results corresponding to the first row of the (2×1024) 2-row pixel area to (2×2) filter 416 at a rate of one bit every four processor cycles.

During the "Rows 1–7" time period, (2×2) filter 416 is inactive. During the "Row 8" time period, filter 416 receives, in every four processor cycles, a 1-bit result corresponding to the first row of a (2×1024) 2-row pixel area of the first compressed image from buffer 414 and a 1-bit result corresponding to the second row of the (2×1024) 2-row pixel area image from filter 412. These two 1-bit results correspond to a (2×2) pixel area in the first compressed image. Filter 416 performs an "AND" operation on the two 1-bit results, and transmits 1-bit results corresponding to the (2×1024) 2-row pixel area to (1×2) filter 418 at a rate of one bit every four processor cycles.

Each 1-bit result generated by filter 416 corresponds to a non-overlapping (2×2) pixel area in the (512×1024) first compressed image and represents an (8×8) pixel area in the (2048×4096) selected thresholded image. Filters 412 and 416 and buffer 414 repeat this processing for each (2×1024) 2-row pixel area of the first compressed image. As such, filters 412 and 416 and buffer 414 implement a (2×2) MIN compression filter that effectively compresses the (512×1024) first compressed image to a (256×512) second compressed image.

FIG. 7 presents a timing table showing the processing activities performed by filters 418 and 422 and buffer 420, which implement a (2×2) MIN compression filter on the (256×512) second compressed image. (1×2) filter 418, (1×2) buffer 420, and (2×2) filter 422 operate analogously to filter 412, buffer 414, and filter 416, respectively. Since each row of the second compressed image represents eight rows of the selected thresholded image, filters 418 and 422 and buffer 420 process one row of the second compressed image for every eight rows received by filter 402 from input buffer 202. Because each row of the second compressed image has 512 binary pixels, buffer 420 stores 256 1-bit results from filter 418. Filters 418 and 422 and buffer 420 effectively compress the (256×512) second compressed image to a (128×256) third compressed image. Filter 422 transmits the binary pixels corresponding to the third compressed image to both (1×2) filter 424 and compression selection multiplexer 430 at a rate of one binary pixel every eight processor cycles.

FIG. 8 presents a timing table showing the processing activities performed by filters 424 and 428 and buffer 426, which implement a (2×2) MAX compression filter on the (128×256) third compressed image. (1×2) filter 424, (1×2) buffer 426, and (2×2) filter 428 operate similarly to filter 412, buffer 414, and filter 416, respectively. However, since filters 424 and 428 and buffer 426 implement a MAX filter, filters 424 and 428 apply "OR" functions to their respective inputs. Since each row of the third compressed image represents sixteen rows of the selected thresholded image, filters 424 and 428 and buffer 426 process one row of the third compressed image for every sixteen rows received by filter 402 from input buffer 202. Because each row of the third compressed image has 256 binary pixels, buffer 426 stores 128 1-bit results from filter 424. Filters 424 and 428 and buffer 426 effectively compress the (128×256) third compressed image to a (64×128) fourth compressed image. Filter 428 transmits the binary pixels corresponding to the fourth compressed image to compression selection multiplexer 430 at a rate of one binary pixel every sixteen processor cycles.

If the fourth compression filter performed by filters 424 and 428 and buffer 426 is activated, then compression selection multiplexer 430 transmits the binary pixels from filter 428 corresponding to the (64×128) fourth compressed image to output buffer 212 of VICKey card 106. Otherwise, multiplexer 430 transmits the binary pixels from filter 422 corresponding to the (128×256) third compressed image to output buffer 212. The fourth compression filter is preferably activated. The binary pixels transmitted by multiplexer 430 to output buffer 212 correspond to the final compressed image.

In this preferred embodiment of VICKey card 106, working memory 210 requires 2944 memory cells to process a thresholded image having 4096 binary pixels per row. The 2944 memory cells correspond to the sum of the 1024 1-bit results stored in buffer 404, the 1024 1-bit results stored in buffer 408, the 512 1-bit results stored in buffer 414, the 256 1-bit results stored in buffer 420, and the 128 1-bit results stored in buffer 426. This preferred embodiment can process input images of any height and width, provided the numbers of pixel rows and columns are integer multiples of 32.

Those skilled in the art will understand that where successive filter stages perform the same function, further memory reductions may be achieved. For example, since the (4×4) compression filter and the first two (2×2) compression filters are all preferably MIN filters, an alternative embodiment could implement these three filters as one (16×16) MIN filter that could provide additional reductions in memory usage. The preferred embodiment described above balances the advantage of reduced memory usage against the advantages of providing a flexible system that may be used to implement different sequences of MIN and MAX compression filters. It will also be understood that other filtering schemes employing filters other than MIN and MAX filters may require additional memory than the embodiment described in detail above.

Exemplary Sequence of Compression Filters

Figure 9:
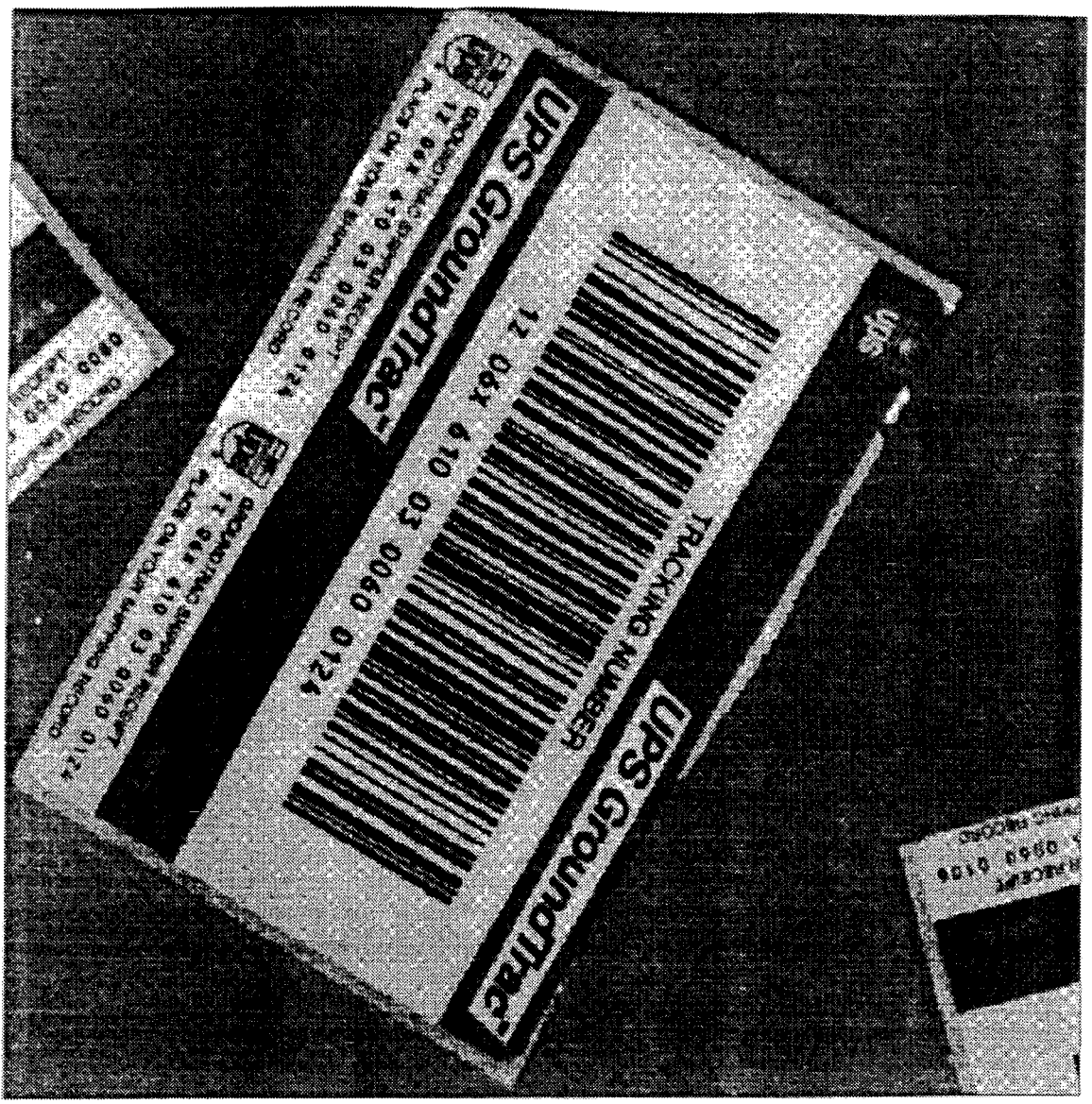
FIG. 9 presents a (512×512) 8-bit gray-scale input image containing a barcode symbol.

FIGS. 9 through 14 present pixel images demonstrating the application of a preferred sequence of compression filters implemented by VICKey card 106 of location system 100. FIG. 9 presents an input image containing a barcode symbol. FIG. 9 is a (512×512) 8-bit gray-scale input image, where each 8-bit pixel is represented by an intensity level from 0 to 255.

Figure 10:
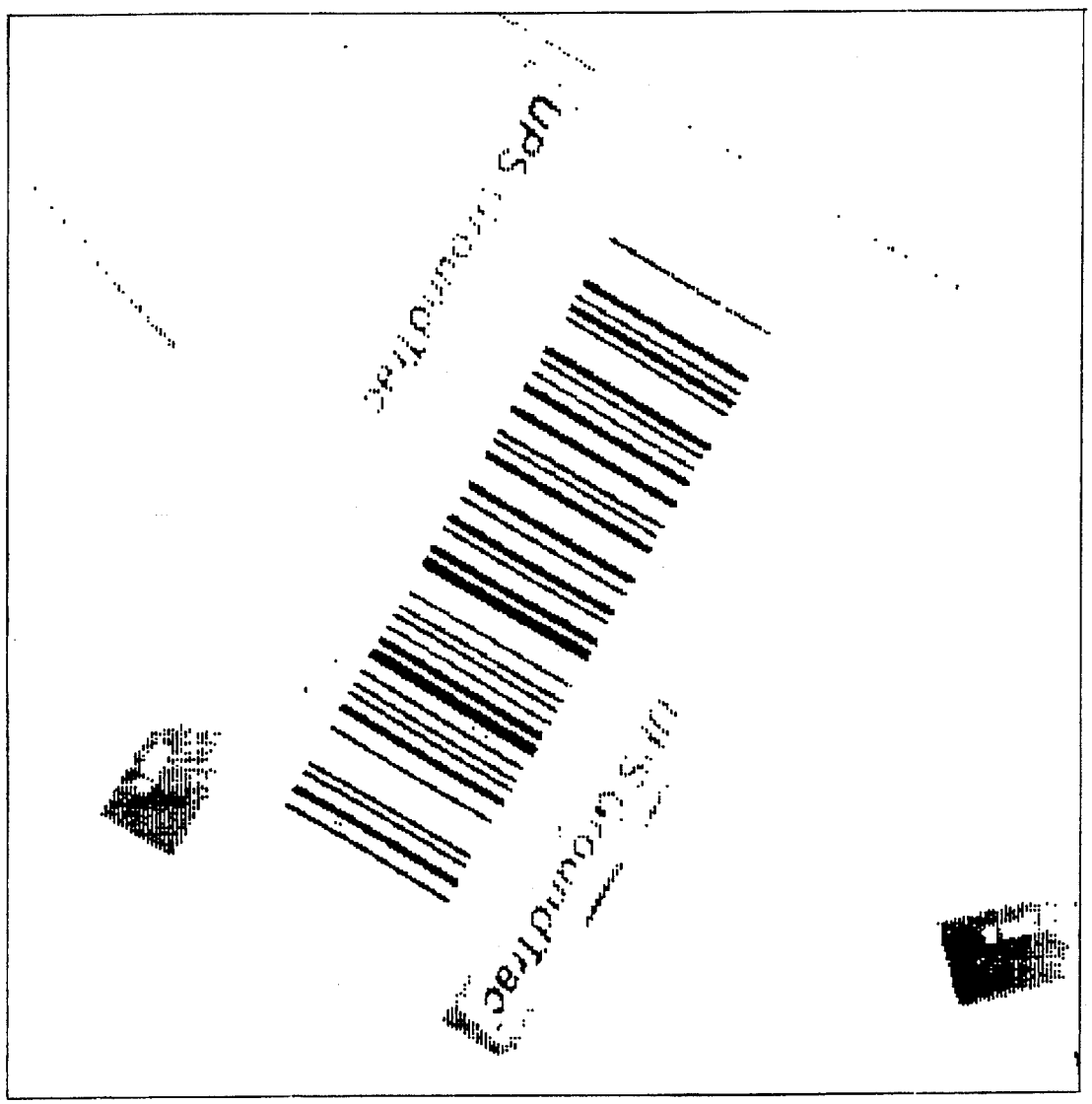
FIG. 10 presents the (512×512) binary thresholded image generated by thresholding FIG. 9 at an intensity level of 70.

FIG. 10 presents a selected thresholded image that results from thresholding the input image of FIG. 9 at an intensity level of 70. Every 8-bit pixel in the input image of FIG. 9 that has an intensity level of 70 or lower is represented as a black binary pixel in the selected thresholded image of FIG. 10 corresponding to the value "0". All other 8-bit pixels in FIG. 9 having an intensity level greater than 70 are represented in the selected thresholded image of FIG. 10 as white binary pixels corresponding to the value "1". Thus, the selected thresholded image of FIG. 10 is a (512×512) binary image.

Figure 11:
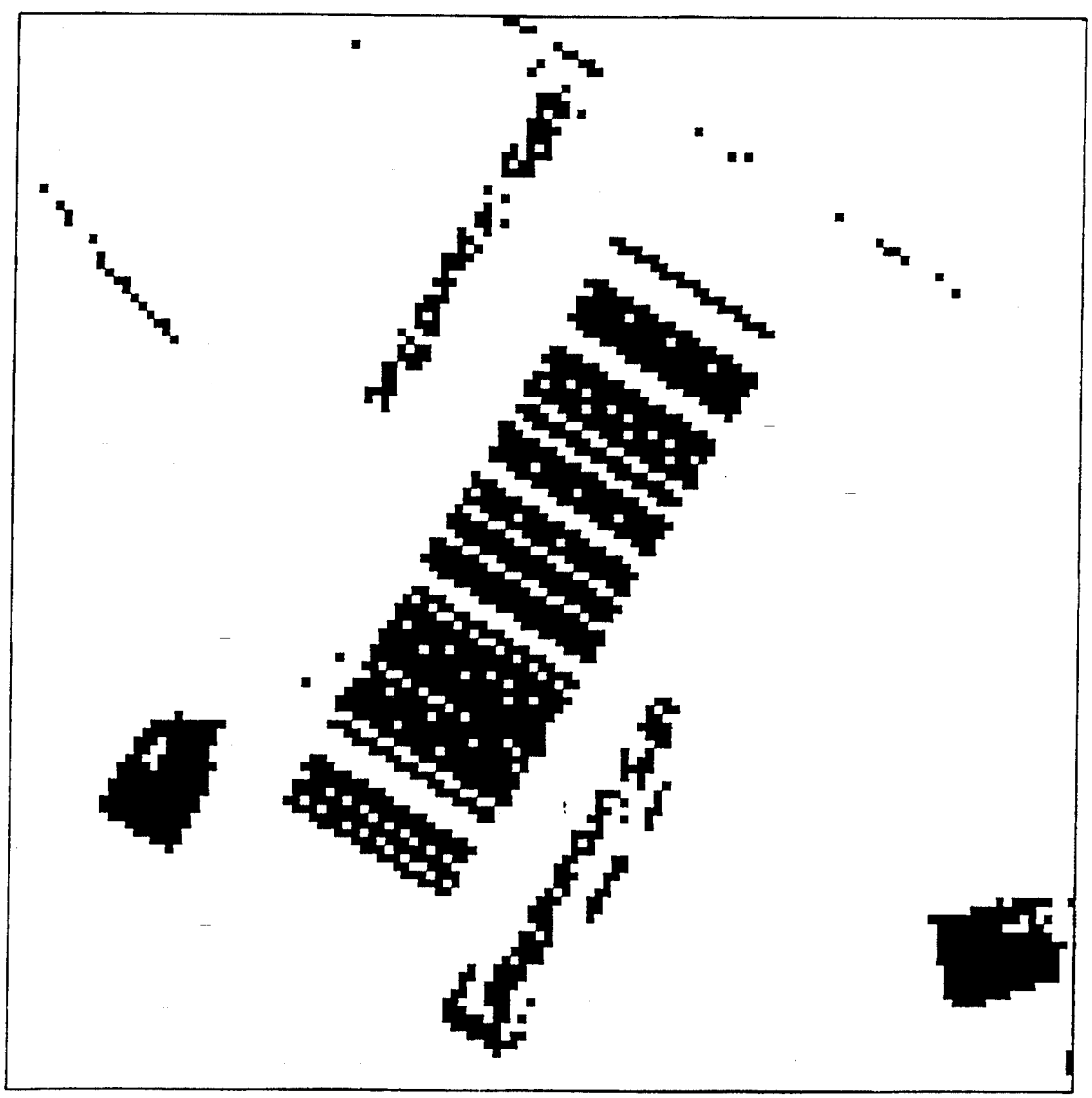
FIG. 11 presents the (128×128) binary compressed image generated by applying a (4×4) MIN compression filter to the thresholded image of FIG. 10.

FIG. 11 presents a first compressed image that results from applying a (4×4) MIN compression filter, such as filter 304 of FIG. 3, to the selected thresholded image of FIG. 10. The first compressed image is a (128×128) binary image. Each binary pixel in the first compressed image of FIG. 11 represents a (4×4) pixel area in the selected thresholded image of FIG. 10.

Figure 12:
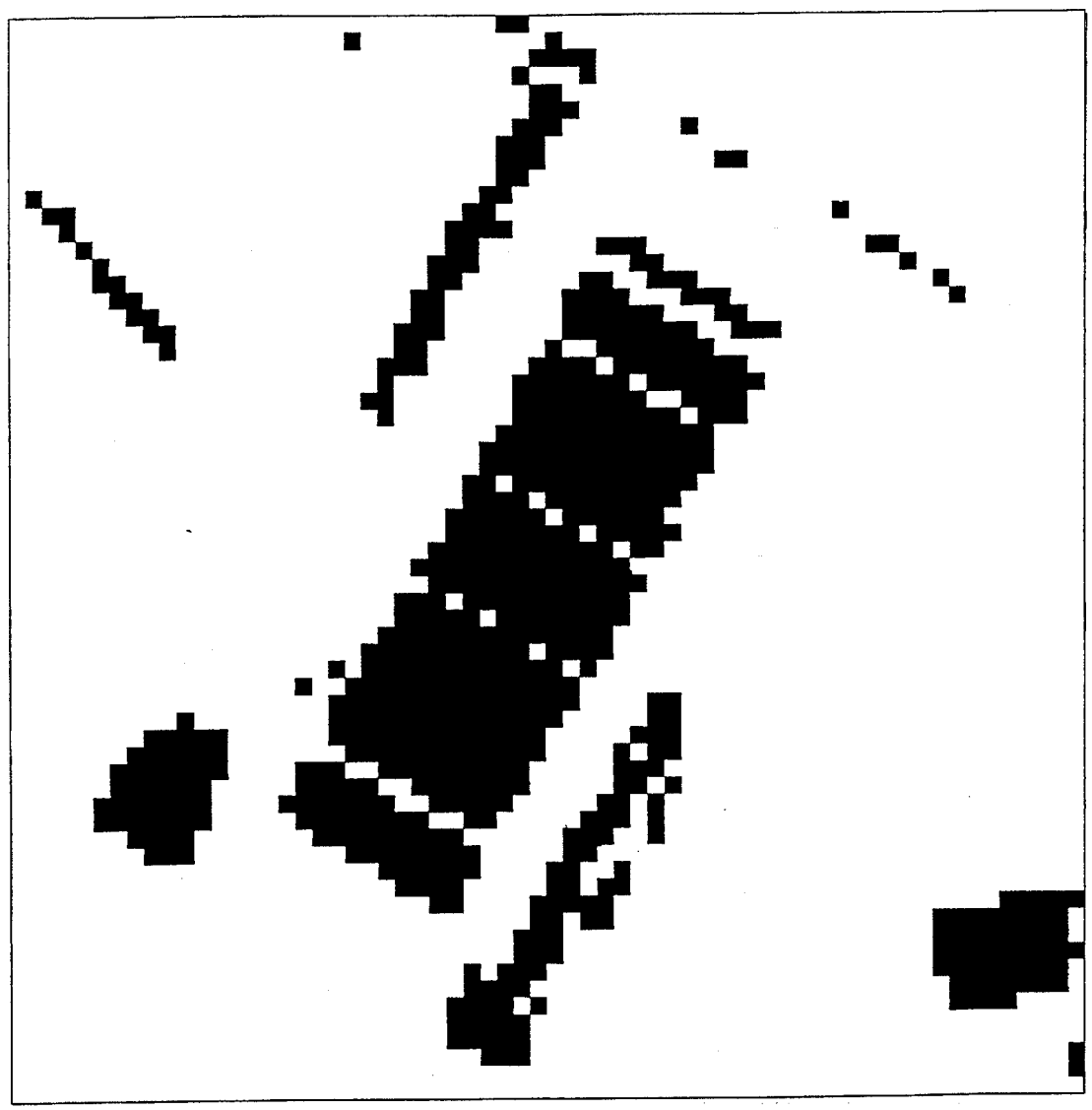
FIG. 12 presents the (64×64) binary compressed image generated by applying a (2×2) MIN compression filter to the compressed image of FIG. 11.

FIG. 12 presents a second compressed image that results from applying a (2×2) MIN compression filter, such as filter 308 of FIG. 3, to the first compressed image of FIG. 11. The second compressed image is a (64×64) binary image. Each binary pixel in the second compressed image of FIG. 12 represents a (2×2) pixel area in the first compressed image of FIG. 11.

Figure 13:
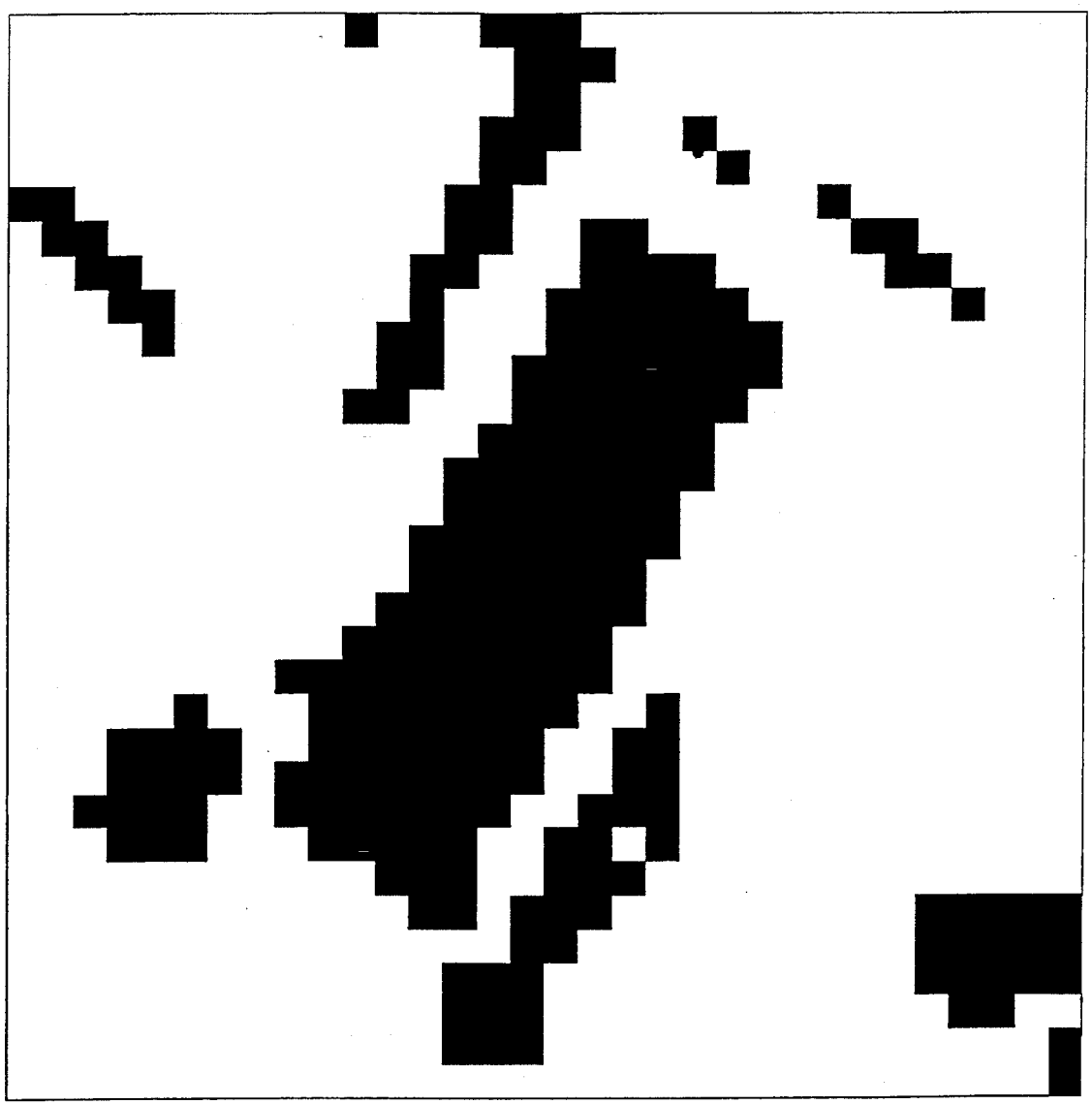
FIG. 13 presents the (32×32) binary compressed image generated by applying a (2×2) MIN compression filter to the compressed image of FIG. 12.

FIG. 13 presents a third compressed image that results from applying a (2×2) MIN compression filter, such as filter 312 of FIG. 3, to the second compressed image of FIG. 12. The third compressed image is a (32×32) binary image. Each binary pixel in the third compressed image of FIG. 13 represents a (2×2) pixel area in the second compressed image of FIG. 12.

Figure 14:
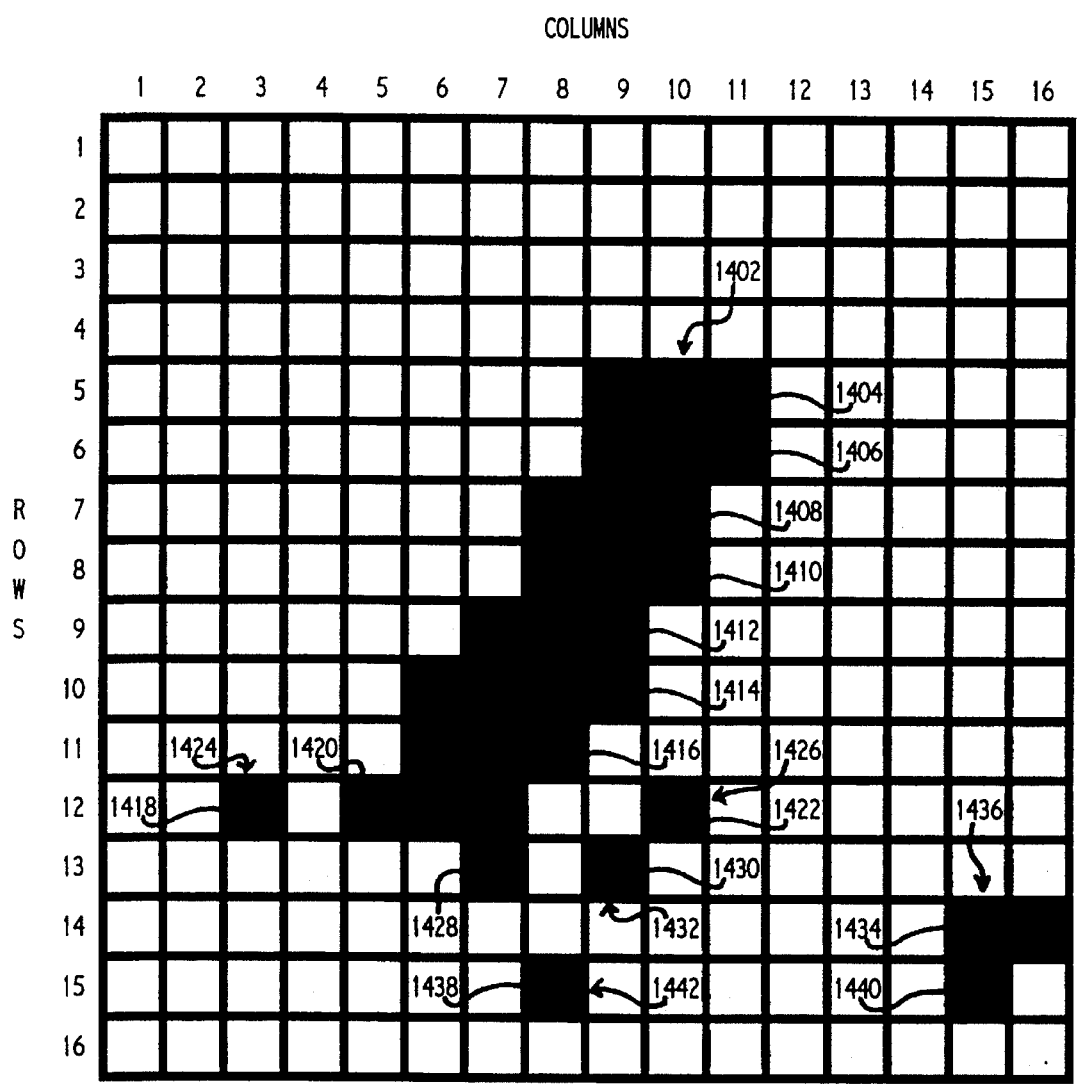
FIG. 14 presents the (16×16) binary compressed image generated by applying a (2×2) MAX compression filter to the compressed image of FIG. 13.

FIG. 14 presents a fourth compressed image that results from applying a (2×2) MAX filter, such as filter 316 of FIG. 3, to the third compressed image of FIG. 13. The fourth compressed image of FIG. 14 is a (16×16) binary image. Each binary pixel in the fourth compressed image of FIG. 14 represents a (2×2) pixel area in the third compressed image of FIG. 13. The binary pixels of the (16×16) fourth compressed image of FIG. 14 are preferably transmitted by VICKey card 106 to processor 108.

Location of Artifacts in Compressed Image

Processor 108 of location system 100 receives from VICKey card 106 the binary pixels of a final compressed image that corresponds to the input image. If the fourth compression filter is activated, then the final compressed image is selected to be the fourth compressed image; otherwise, the final compressed image is selected to be the third compressed image. Processor 108 analyzes the final compressed image to locate regions that correspond to candidate barcode symbols in the input image. This analysis comprises searching through the final compressed image for isolated, contiguous black regions of proper geometry. The locations of these black regions in the final compressed image are used to select sub-images in the input image that may contain barcode symbols. Coordinates for these sub-images are then transmitted by processor 108 to processor 110, which searches those sub-images for barcode symbols and, if found, decodes them.

Figure 15:
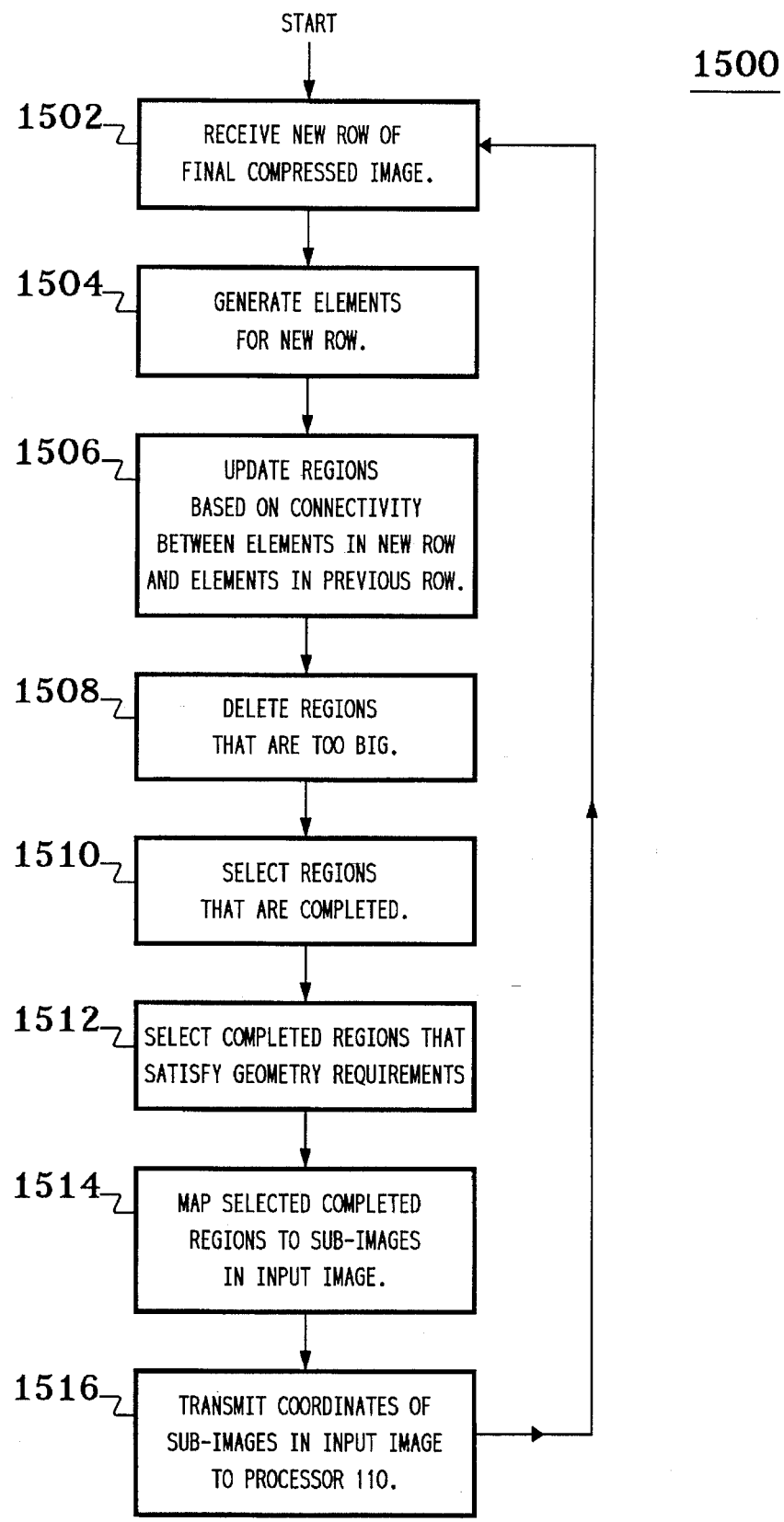
FIG. 15 presents a process flow diagram of a sub-image identification subsystem for identifying sub-images in input images that may contain barcode symbols according to the location system of FIG. 1.

FIG. 15 presents a process flow diagram of sub-image identification subsystem 1500 of processor 108 for identifying sub-images in the input image that may contain barcode symbols. In a preferred pipeline embodiment, sub-image identification subsystem 1500 processes each row of the final compressed image as it is received from VICKey card 106. In this embodiment, identification subsystem 1500 supports operation of location system 100 in a continuous mode of operation in which a sequence of images is processed as one continuous image.

In analyzing a final compressed image, identification subsystem 1500 represents isolated, contiguous black regions in the final compressed image using elements, element lists, and a list of regions. An element is a set of one or more contiguous black pixels in a row of the final compressed image. For example, an element comprises only one black pixel if that pixel has white pixels to the left and right. An element comprises two black pixels if each of two black pixels is adjacent to the other and also adjacent to a white pixel. Each row of a final compressed image may comprise zero, one, or more elements.

A region defines an isolated, contiguous black region in the final compressed image. An element list is a list of elements from one or more different rows in the final compressed image that form a region. In a preferred embodiment based on four-way connectivity, a first element in one row of the final compressed image is "connected" to a second element in the next row if at least one binary pixel of the first element shares a side with a binary pixel of the second element. Each element in an element list of a region is connected to at least one other element in that region's element list. At a particular point in the processing of a final compressed image, there may be zero, one, or more regions in the region list representing isolated, contiguous regions in the final compressed image.

Means 1502 of identification subsystem 1500 receives a new row of binary pixels from the final compressed image generated by VICKey card 106. Means 1504 generates the elements for the new row. Means 1506 updates the set of regions in the region list by comparing the elements in the new row with the elements in the element list of each region in the region list. If an element in the new row is connected to an element in the element list of a given region, then the element in the new row is added to the element list for that region. If an element in the new row is connected to two or more elements in the element lists of separate regions, then the two or more regions corresponding to those two or more elements are merged into one new region whose element list contains all the elements in those two or more regions plus the element in the new row. If an element in the new row is not connected to any of the elements in any of the element lists, then a new region is added to the region list containing in its element list only the element in the new row.

Means 1508 deletes from the region list those regions that are too big. In applications where location system finds barcode symbols of known minimum and maximum dimensions and areas, barcode symbols in input images are represented in final compressed images by isolated, contiguous black regions with areas falling between known minimum and maximum areas. In these applications, identification subsystem 1500 may ignore black regions in the final compressed image that are too big or too small. These black regions may represent areas in the input images other than barcode symbols. In alternative applications in which other symbologies are being located, the minimum and maximum dimensions and areas may be different.

Means 1508 tests the size of each black region of the final compressed image currently represented by the region list against a specified maximum threshold that may represent the largest barcode symbol expected in the input images. The size of a black region is the total number of black pixels in all of the elements in the element list corresponding to the black region. If the size of a black region exceeds the specified maximum threshold, means 1508 deletes that region from the current region list.

Means 1510 selects those regions that are completed. A region is completed if none of the elements in a region's element list is connected to any element in the new row of the final compressed image. The element list for a completed region comprises all the elements that correspond to an isolated, contiguous region in the final compressed image.

Means 1512 analyzes the completed regions identified by means 1510 against specified geometry requirements. As described earlier in this section in conjunction with means 1508, isolated, contiguous black regions in the final compressed image that are too big or too small may be rejected as not representing candidate barcode symbols. Since means 1508 has already ensured that completed regions are not too big, means 1512 may test the size of each completed region against a specified minimum threshold representing the size of the smallest barcode symbol expected in the input images. If the size of a completed region is less than the minimum threshold, then the completed region is rejected by means 1512. In alternative preferred embodiments, means 1512 may implement alternative geometry tests including, for example, testing the ratio of major and minor axes of each completed region against specified thresholds, where the axes are determined by performing conventional statistical analyses on the completed region.

Any completed region in the final compressed image that satisfies the geometry requirements of means 1512 is considered to represent a candidate barcode symbol in the input image. Means 1514 maps each completed region selected by means 1510 back to the input image to determine the coordinates of a sub-image in the input image that contains the candidate barcode symbol. This mapping is described in further detail later in this section in conjunction with the example of FIG. 14. Each sub-image in the input image may be uniquely designated by the two rows and two columns that form the outer boundary of the sub-image. Means 1516 then transmits the boundary data for each sub-image in the input image containing a candidate barcode symbol to processor for barcode symbol identification and decoding. The boundary data defines the two-dimensional gray-scale pixel image received as input by the barcode symbol detecting and decoding systems described in the three U.S. patent applications filed Aug. 10, 1992 referred to earlier in this specification in conjunction with FIG. 1.

Those skilled in the art will understand that when location system 100 is operated in a continuous mode in which a series of input images are processed as one continuous image, barcode symbols that fall partially within the "bottom" of one input image and partially within the "top" of the next input image may successfully be processed by location system 100. This may be achieved with either the snapshot, partial snapshot, or pipeline embodiments.

The operations of identification subsystem 1500 may further be illustrated in the context of the particular example of the fourth and final compressed image of FIG. 14. When processing of identification subsystem 1500 begins, no rows of the final compressed image have yet been processed and there are no regions. Means 1502 first receives the binary pixels from row 1 of the final compressed image of FIG. 14. Since all of these binary pixels are white, there are no elements in row 1 and means 1504 generates no elements for row 1. Since there are no regions yet, processing flows from means 1506 through means 1516 and returns to means 1502 to receive the next row of the final compressed image. The same is true for rows 2, 3, and 4, which also contain only white pixels.

After means 1502 receives row 5, means 1504 generates element 1404 for row 5, where element 1404 comprises pixels (9,5), (10,5), and (11,5). Since there are no regions in the region list, means 1506 enters new region 1402 in the region list, where the element list for region 1402 contains element 1404. Means 1508 compares the size of region 1402 to the specified maximum threshold to determine whether region 1402 is too big. At this point in the processing, region 1402 has an area of three pixels. A typical specified maximum threshold for a barcode symbol may be approximately 50 pixels. As such, means 1508 determines that region 1402 is not too big. Means 1510 then determines whether region 1402 is completed. Since element 1404 forms part of region 1402, region 1402 is not completed. Processing then continues from means 1512 through means 1516 and returns to means 1502.

After means 1502 receives row 6, means 1504 generates element 1406 for row 6, where element 1406 comprises pixels (9,6), (10,6), and (11,6). After means 1506 determines that element 1406 of row 6 is connected to element 1404 of row 5, means 1506 updates the element list for region 1402 by adding element 1406 to the element list for region 1402. Means 1508 determines that the current area of region 1402 of 6 pixels is still less than the specified maximum threshold of 50 pixels. Since element 1406 forms part of region 1402, means 1510 determines that region 1402 is not completed, and processing continues through means 1516 and returns to means 1502.

Identification subsystem 1500 continues to process rows 7 through 11 of the final compressed image of FIG. 14 in similar fashion, adding elements 1408 through 1416 to the element list for region 1402. After means 1502 receives row 12, means 1504 generates elements 1418, 1420, and 1422 for row 12, where element 1418 comprises pixel (3,12), element 1420 comprises pixels (5,12), (6,12), and (7,12), and element 1422 comprises pixel (10,12). Means 1506 adds regions 1424 and 1426 to the region list, where the element list for region 1424 contains element 1418 and the element list for region 1426 contains element 1422. Means 1506 also adds element 1420 to the element list for region 1402.

Means 1504 generates elements 1428 and 1430 for row 13. Means 1506 adds element 1428 to the element list for region 1402 and adds new region 1432 containing element 1430 to the region list. Element 1430 in row 12 is not connected to element 1422 in row 13, because they have only a common corner and not a common side. At this point, there are four regions in the region list representing regions 1402, 1424, 1426, and 1432. Since the largest region is region 1402 with 26 pixels, means 1508 determines that none of these four regions is too big. Means 1510 then determines that regions 1424 and 1426 are completed because they are not connected to any elements of row 13.

Means 1512 determines whether each of completed regions 1424 and 1426 is too small by comparing the area of each region to a specified minimum threshold. A typical specified minimum threshold for a barcode symbol may be approximately 15 pixels. Since both completed regions 1424 and 1426 have an area of 1 pixel, means 1512 rejects completed regions 1424 and 1426 as not corresponding to candidate barcode symbols. Completed regions 1424 and 1426 may then be deleted from the region list.

For row 14, means 1504 generates element 1434. Means 1506 adds new region 1436 containing element 1434 to the region list. Means 1508 determines that regions 1402, 1432, and 1436 are not too big. Means 1510 then determines that regions 1402 and 1432 are completed, since they are not connected to any element of row 14. Means 1512 rejects completed region 1432 as too small, but selects completed region 1402 as representing a candidate barcode symbol, because region 1402 satisfies the specified geometry requirements.

Means 1514 then maps selected completed region 1402 to a sub-image in the input image of FIG. 9 from which the final compression image of FIG. 14 was generated. Means 1514 analyzes the element list for region 1402 to identify the top and bottom rows and the left and right columns of region 1402. Region 1402 has top row 5, bottom row 13, left column 5, and right column 11. Means 1514 maps these rows and columns back to the input image by reversing the compression ratio. In the example of FIGS. 9 through 14, all four compression filters are activated and the compression ratio for both rows and columns is 32. Thus, row 1 of the final compressed image of FIG. 14 represents rows 1 through 32 of the input image of FIG. 9, row 2 represents rows 33 through 64, etc.

The top row of a region may be mapped back to the input image by multiplying the row number in the final compressed image by the compression ratio n (for FIG. 14, n=32) and subtracting (n−1) from the result. An equivalent equation may be used to map the left column of a region to the input image. When mapping the bottom row or right column of a region back to the input image, the row or column number in the final compressed image is multiplied by n and then an additional (n−1) pixels is added to the result. In the final compressed image of FIG. 14, top row 5 of region 1402 is mapped back to input row 129 in the input image of FIG. 9; bottom row 13, to input row 497; left column 5, to input column 129; and right column 11, to input column 383.

The resulting two rows and two columns define the sub-image of the input image that corresponds to region 1402 in the final compressed image. In a preferred embodiment, the borders of this sub-image may be further expanded by fixed numbers of pixels in each direction to ensure that the sub-image contains the entire candidate barcode symbol. The degree to which the borders of the sub-image in the input image are expanded may be determined experimentally to ensure complete enclosure of the area of interest within the sub-image borders. The two rows and two columns for each region are then transmitted by means 1516 to processor 110 for barcode symbol identification and decoding.

Processing then returns to means 1502 to receive row 15. Means 1504 generates elements 1438 and 1440 for row 15. Means 1506 adds new region 1442 containing element 1438 to the region list and adds element 1440 to the element list for region 1436. When row 16 is processed, means 1510 determines that regions 1441 and 1436 are completed, but then means 1512 rejects these two completed regions as being too small to represent candidate barcode symbols and deletes them from the region list.

Thus, in the example of the final compressed image of FIG. 14, identification subsystem 1500 generated six regions corresponding to regions 1402, 1424, 1426, 143Z, 1436, and 1442, only region 1402 of which was selected as satisfying the specified geometry requirements for candidate barcode symbols. Region 1402 represents the barcode symbol contained in the input image of FIG. 9. Therefore, location system 100 filtered the input image with a sequence of thresholding and compression filters, and analyzed the resulting final compressed image to identify successfully a sub-image containing the one and only barcode symbol in the input image.

An alternative embodiment of the present invention is based on 8-way connectivity in which a black pixel is said to be connected to another black pixel if they share at least a common corner. In this embodiment, identification system 1500 would consider regions 1426 and 1432 of FIG. 14 to be a single isolated, contiguous black region.

It will be understood by those skilled in the art that various elements of the system of the present invention may be implemented in either hardware or software and/or by either serial or parallel processing. It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for finding an area of interest in an input image, comprising the steps of:

(a) filtering said input image with a two-dimensional filter to generate a filtered image, wherein at least part of the filter is applied to each entire row of the input image before any part of the filter is applied to any pixels of the next row of the input image;

(b) determining the location of an artifact in said filtered image; and (c) determining the location of said area of interest in said input image according to said location of said artifact in said filtered image, wherein step (a) comprises the steps of:

(1) filtering the input image with a (4×4) compression filter to generate a first compressed image, wherein at least part of the (4×3) compression filter is applied to each entire row of the input image before any part of the (4×4) compression filter is applied to any pixels of the next row of the input image;

(2) filtering the first compressed image with a first (2×2) compression filter to generate a second compressed image, wherein at least part of the first (2×2) compression filter is applied to each entire row of the first compressed image before any part of the first (2×2) compression filter is applied to any pixels of the next row of the first compressed image;

(3) filtering the second compressed image with a second (2×2) compression filter to generate a third compressed image, wherein at least part of the second (2×2) compression filter is applied to each entire row of the second compressed image before any part of the second (2×2) compression filter is applied to any pixels of the next row of the second compressed image; and (4) optionally filtering the third compressed image with a third (2×2) compression filter to generate a fourth compressed image, wherein at least part of the third (2×2) compression filter is applied to each entire row of the third compressed image before any part of the third (2×2) compression filter is applied to any pixels of the next row of the third compressed image, wherein:

the first (2×2) compression filter is applied to at least part of the first compressed image before the (4×4) compression filter is completely applied to the input image;

the second (2×2) compression filter is applied to at least part of the second compressed image before the first (2×2) filter is completely applied to the first compressed image;

the third (2×2) compression filter is optionally applied to at least part of the third compressed image before the second (2×2) compression filter is completely applied to the second compressed image; and if the third (2×2) compression filter is applied, then the filtered image comprises the fourth compressed image; otherwise, the filtered image comprises the third compressed image.

2. The method of claim 1, wherein said area of interest comprises a barcode symbol.

3. The method of claim 1, wherein said input image comprises a two-dimensional gray-scale pixel image generated with a CCD camera.

4. The method of claim 1, wherein said filtered image comprises a plurality of rows of binary pixels, step (b) comprises the steps of:

(1) receiving a row of said filtered image;

(2) determining which pixels of said row correspond to a black region in said filtered image;

(3) saving said pixels corresponding to said black region in a list for said black region;

(4) determining if said list is complete;

(5) if said list is complete, then determining whether said black region satisfies specified geometry requirements;

(6) if said black region satisfies said specified geometry requirements, then selecting said black region as said artifact in said filtered image;

(7) selecting top and bottom rows and left and right columns corresponding to said location of said artifact;

(8) repeating steps (b)(1) through (b)(7) for each row of said filtered image, and wherein step (c) comprises the step of mapping said selected top and bottom rows and left and right columns from said filtered image to identify said location of said area of interest in said input image.

5. The method of claim 1, wherein the (4×4) compression filter and the first and second (2×2) compression filters each comprise a MIN compression filter and the third (2×2) compression filter comprises a MAX compression filter.

6. An apparatus for finding an area of interest in an input image, comprising:

(a) filtering means for filtering said input image with a filter to generate a filtered image, wherein at least part of the filter is applied to each entire row of the input image before any part of the filter is applied to any pixels of the next row of the input image;

(b) first determining means for determining the location of an artifact in said filtered image; and (c) second determining means for determining the location of said area of interest in said input image according to said location of said artifact in said filtered image, wherein the filtering means comprises:

(1) a (4×4) compression filter for filtering the input to generate a first compressed image, wherein at least part of the (4×4) compression filter is applied to each entire row of the input image before any part of the (4×4) compression filter is applied to any pixels of the next row of the input image:

(2) a first (2×2) compression filter for filtering the first compressed image to generate a second compressed image, wherein at least part of the first (2×2) compression filter is applied to each entire row of the first compressed image before any part of the first (2×2) compression filter is applied to any pixels of the next row of the first compressed image (3) a second (2×2) compression filter for filtering the second compressed image to generate a third compressed image, wherein at least part of the second (2×2) compression filter is applied to each entire row of the second compressed image before any part of the second (2×2) compression filter is applied to any pixels of the next row of the second compressed image; and (4) a third (2×2) compression filter for optionally filtering the third compressed image to generate a fourth compressed image, wherein at least part of the third (2×2) compression filter is applied to each entire row of the third compressed image before any part of the third (2×2) compression filter is applied to any pixels of the next row of the third compressed image, wherein:

the first (2×2) compression filter is applied to at least part of the first compressed image before the (4×4) compression filter is completely applied to the input image;

the second (2×2) compression filter is applied to at least part of the second compressed image before the first (2×2) compression filter is completely applied to the first compressed image;

the third (2×2) compression filter is optionally applied to at least part of the third compressed image before the second (2×2) compression filter is completely applied to the second compressed image; and if the third (2×2) compression filter is applied, then the filtered image comprises the fourth compressed image; otherwise, the filtered image comprises the third compressed image.

7. The apparatus of claim 6, wherein said area of interest comprises a barcode symbol.

8. The apparatus of claim 6, wherein said input image comprises a two-dimensional gray-scale pixel image generated with a CCD camera.

9. The apparatus of claim 6, wherein said filtered image comprises a plurality of rows of binary pixels, said first determining means comprises:

(1) means for receiving a row of said filtered image;

(2) means for determining which pixels of said row correspond to a black region in said filtered image;

(3) means for saving said pixels corresponding to said black region in a list for said black region;

(4) means for determining if said list is complete;

(5) means for determining whether said black region satisfies specified geometry requirements, if said list is complete;

(6) means for selecting said black region as said artifact in said filtered image, if said black region satisfies said specified geometry requirements;

(7) means for selecting top and bottom rows and left and right columns corresponding to said location of said artifact, and wherein said second determining means comprises means for mapping said selected top and bottom rows and left and right columns from said filtered image to identify said location of said area of interest in said input image.

10. The apparatus of claim 6, wherein the (4×4) compression filter and the first and second (2×2) compression filters each comprise a MIN compression filter and the third (2×2) compression filter comprises a MAX compression filter.

11. An apparatus for filtering an input image, comprising:

(a) a (1×4) filter for receiving a plurality of pixels from the input image one row at a time and for filtering the pixels, the (1×4) filter having a first scale factor;

(b) a linear (1×4) buffer for receiving and temporarily storing filtered pixels from the (1×4) filter;

(c) a (2×4) filter for receiving filtered pixels from the (1×4) filter and the (1×4) buffer and for further filtering the filtered pixels, the (2×4) filter having a second scale factor different from the first scale factor;

(d) a linear (2×4) buffer for receiving and temporarily storing the filtered pixels from the (2×4) filter;

(e) a (4×4) filter for receiving filtered pixels from the (1×4) filter, the (1×4) buffer, and the (2×4) buffer and for further filtering the filtered pixels, the (4×4) filter having a third scale factor different from the first scale factor and different from the second scale factor;

(f) a first (1×2) filter for receiving the filtered pixels from the (4×4) filter and for further filtering the filtered pixels, the first (1×2) filter having a fourth scale factor;

(g) a first linear (1×2) buffer for receiving and temporarily storing filtered pixels from the first (1×2) filter;

(h) a first (2×2) filter for receiving filtered pixels from the first (1×2) filter and the first (1×2) buffer and for further filtering the filtered pixels, the first (2×2) filter having a fifth scale factor different from the fourth scale factor;

(i) a second (1×2) filter for receiving the filtered pixels from the first (2×2) filter and for further filtering the filtered pixels, the second (1×2) filter having the fourth scale factor;

(j) a second linear (1×2) buffer for receiving and temporarily storing filtered pixels from the second (1×2) filter;

(k) a second (2×2) filter for receiving filtered pixels from the second (1×2) filter and the second (1×2) buffer and for further filtering the filtered pixels, the second (2×2) filter having the fifth scale factor;

(l) a third (1×2) filter for optionally receiving the filtered pixels from the second (2×2) filter and for optionally further filtering the filtered pixels, the third (1×2) filter having the fourth scale factor;

(m) a third linear (1×2) buffer for optionally receiving and optionally temporarily storing filtered pixels from the third (1×2) filter; and (k) a third (2×2) filter for optionally receiving filtered pixels from the third (1×2) filter and the third (1×2) buffer and for optionally further filtering the filtered pixels, the third (2×2) filter having the fifth scale factor.

12. The apparatus of claim 11, wherein each of the (1×4) filter, the (2×4) filter, the (4×4) filter, the first (1×2) filter, the first (2×2) filter, the second (1×2) filter, and the second (2×2) filter comprises a MIN compression filter and wherein each of the third (1×2) filter and the third (2×2) filter comprises a MAX compression filter.

* * * * *

UNITED STATES PATENT AND TRADEMARK OFFICE
CERTIFICATE OF CORRECTION

PATENT NO. : 5,524,068
DATED : June 4, 1996
INVENTOR(S) : Peter N. Kacandes and John H. Dowling It is certified that error appears in the above-indentified patent and that said Letters Patent is hereby corrected as shown below:

Title page, [56] References Cited:
Add the following cited patent references:
US 4,873,426, 10/89, Sarna et al.
US 5,073,954, 12/91, Van Tyne et al.
US 5,097,518, 03/92, Scott et al.
US 5,097,520, 03/92, Bessho et al.

Column 6, line 52:
Delete "AMAX", and insert therefor --A MAX--.
Column 13, line 29:
After "filter", insert --412--.

Column 20, line 55:
Delete "(4x3)", and insert therefor --(4x4)--.
Column 22, line 9:
After "input", insert --image--.
Column 22, line 14:
Delete ":", and insert therefor --;--.
Column 22, line 21:
After "image", insert --;--.

Signed and Sealed this

Twenty-fifth Day of February, 1997

Attest:

BRUCE LEHMAN

*Attesting Officer*      *Commissioner of Patents and Trademarks*